United States Patent
Baruch et al.

(10) Patent No.: US 10,467,102 B1
(45) Date of Patent: Nov. 5, 2019

(54) I/O SCORE-BASED HYBRID REPLICATION IN A STORAGE SYSTEM

(71) Applicant: EMC IP Holding Company LLC, Hopkinton, MA (US)

(72) Inventors: Leehod Baruch, Rishon Leziyon (IL); Assaf Natanzon, Tel Aviv (IL); Philip Shilane, Newtown, PA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 379 days.

(21) Appl. No.: 15/379,940

(22) Filed: Dec. 15, 2016

(51) Int. Cl.
  G06F 17/30 (2006.01)
  G06F 11/14 (2006.01)
  H04L 29/08 (2006.01)
  G06F 16/11 (2019.01)
  G06F 16/22 (2019.01)

(52) U.S. Cl.
  CPC ........ G06F 11/1446 (2013.01); G06F 16/128 (2019.01); G06F 16/2255 (2019.01); H04L 67/1097 (2013.01); G06F 11/1464 (2013.01); G06F 2201/84 (2013.01)

(58) Field of Classification Search
  CPC ...................................................... G06F 16/00
  See application file for complete search history.

(56) References Cited

U.S. PATENT DOCUMENTS

| 7,203,741 | B2 | 4/2007 | Marco et al. |
| 7,719,443 | B1 | 5/2010 | Natanzon |
| 7,840,536 | B1 | 11/2010 | Ahal et al. |
| 7,840,662 | B1 | 11/2010 | Natanzon |
| 7,844,856 | B1 | 11/2010 | Ahal et al. |
| 7,860,836 | B1 | 12/2010 | Natanzon et al. |
| 7,882,286 | B1 | 2/2011 | Natanzon et al. |
| 7,934,262 | B1 | 4/2011 | Natanzon et al. |
| 7,958,372 | B1 | 6/2011 | Natanzon |
| 8,037,162 | B2 | 10/2011 | Marco et al. |
| 8,041,940 | B1 | 10/2011 | Natanzon et al. |
| 8,060,713 | B1 | 11/2011 | Natanzon |
| 8,060,714 | B1 | 11/2011 | Natanzon |
| 8,103,937 | B1 | 1/2012 | Natanzon et al. |

(Continued)

OTHER PUBLICATIONS

Response to U.S. Non-Final Office Action dated Apr. 9, 2018 for U.S. Appl. No. 15/274,362; Response filed Jun. 26, 2018; 13 pages.

(Continued)

*Primary Examiner* — Khanh B Pham
(74) *Attorney, Agent, or Firm* — Daly, Crowley Mofford & Durkee, LLP

(57) ABSTRACT

Described embodiments provide systems and methods for operating a storage system that may determine one or more properties for each of a plurality of input/output (I/O) to a production volume of a storage system and monitor one or more operating conditions of the storage system. Embodiments may further include determining a score for each I/O based upon one or more of: the one or more properties of the I/O and the one or more operating conditions; adapting a replication threshold based upon the one or more operating conditions; comparing the determined score for each I/O to the adapted replication threshold; and based upon the comparison, performing continuous replication or snapshot replication for each I/O.

18 Claims, 16 Drawing Sheets

(56) References Cited

U.S. PATENT DOCUMENTS

| | | |
|---|---|---|
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |

(56) References Cited

U.S. PATENT DOCUMENTS

| | | | |
|---|---|---|---|
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,002,173 B1* | 6/2018 | Ramachandran | G06F 9/50 |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 | 10/2018 | Ayzenberg et al. |
| 2005/0172092 A1* | 8/2005 | Lam | G06F 11/1451 711/161 |
| 2006/0195666 A1* | 8/2006 | Maruyama | G06F 3/0613 711/162 |
| 2009/0055593 A1* | 2/2009 | Satoyama | G06F 3/0608 711/134 |
| 2009/0313311 A1* | 12/2009 | Hoffmann | G06F 11/2094 707/999.204 |
| 2013/0103893 A1 | 4/2013 | Lee et al. |
| 2014/0195640 A1 | 7/2014 | Kaiser et al. |
| 2015/0379107 A1* | 12/2015 | Rank | G06F 16/27 707/611 |
| 2016/0139836 A1 | 5/2016 | Nallathambi et al. |
| 2018/0143774 A1* | 5/2018 | Carson | G06F 3/0619 |

OTHER PUBLICATIONS

U.S. Non-Final Office Action dated Apr. 9, 2018 for U.S. Appl. No. 15/274,362; 14 pages.

EMC Corporation, "EMC Recoverpoint/EX;" Applied Technology; White Paper; Apr. 2012; 17 Pages.

Final Office Action dated Nov. 2, 2018 for U.S. Appl. No. 15/274,362; 21 Pages.

RCE and Response to Final Office Action dated Nov. 2, 2018 for U.S. Appl. No. 15/274,362, filed Nov. 26, 2018; 14 Pages.

U.S. Non-Final Office Action dated Apr. 9, 2018 for U.S. Appl. No. 15/274,362; 15 Pages.

U.S. Appl. No. 15/274,362, filed Sep. 23, 2016, Baruch, et al.

* cited by examiner

400

406'

504'

506'

508'

510'

604'

606'

608'

610'

708'

916'

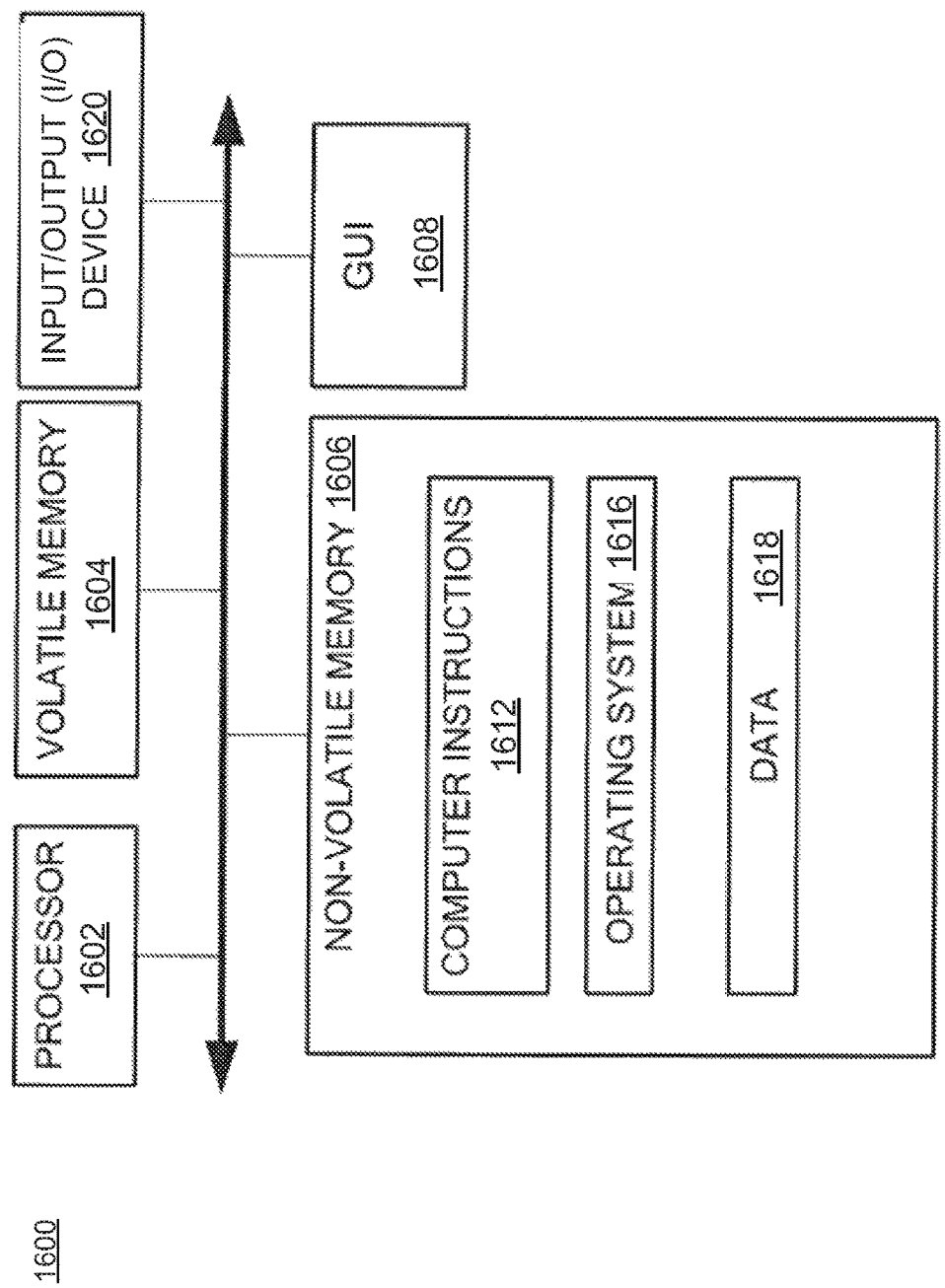

US 10,467,102 B1

I/O SCORE-BASED HYBRID REPLICATION IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. The backup storage system may be situated in the same physical location as the production storage system, or in a physically remote location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a method that may include determining one or more properties for each of a plurality of input/output (I/O) to a production volume of a storage system and monitoring one or more operating conditions of the storage system. In embodiments, a method may include determining a score for each I/O based upon one or more of: the one or more properties of the I/O and the one or more operating conditions; adapting a replication threshold based upon the one or more operating conditions; comparing the determined score for each I/O to the adapted replication threshold; and based upon the comparison, performing continuous replication or snapshot replication for each I/O.

In another aspect, a system may include a processor and memory storing computer program code that when executed on the processor causes the processor to operate a storage system for performing determining one or more properties for each of a plurality of input/output (I/O) to a production volume of a storage system and monitoring one or more operating conditions of the storage system. Embodiments of a system may include determining a score for each I/O based upon one or more of: the one or more properties of the I/O and the one or more operating conditions; adapting a replication threshold based upon the one or more operating conditions; comparing the determined score for each I/O to the adapted replication threshold; and based upon the comparison, performing continuous replication or snapshot replication for each I/O. Another aspect provides a computer program product including a non-transitory computer readable storage medium having computer program code encoded thereon that when executed on a processor of a computer causes the computer to operate a storage system, the computer program product may include computer program code for: determining one or more properties for each of a plurality of input/output (I/O) to a production volume of a storage system and monitoring one or more operating conditions of the storage system. The computer program product may further include instructions for determining a score for each I/O based upon one or more of: the one or more properties of the I/O and the one or more operating conditions; adapting a replication threshold based upon the one or more operating conditions; comparing the determined score for each I/O to the adapted replication threshold; and based upon the comparison, performing continuous replication or snapshot replication for each I/O.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 16 is a block diagram of an example of a hardware device that may perform at least a portion of the processes in FIGS. 4-15, in accordance with an illustrative embodiment.

DETAILED DESCRIPTION

Before describing concepts, structures, and techniques, some terms are explained. As used herein, the term "I/O request" or simply "I/O" may refer to an input or output request, for example a data read or a data write request. The term "storage system" may encompass physical computing systems, cloud or virtual computing systems, or a combination thereof. The term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN), etc.). The term "storage device" may also refer to a storage array including multiple storage devices.

Figure 1:
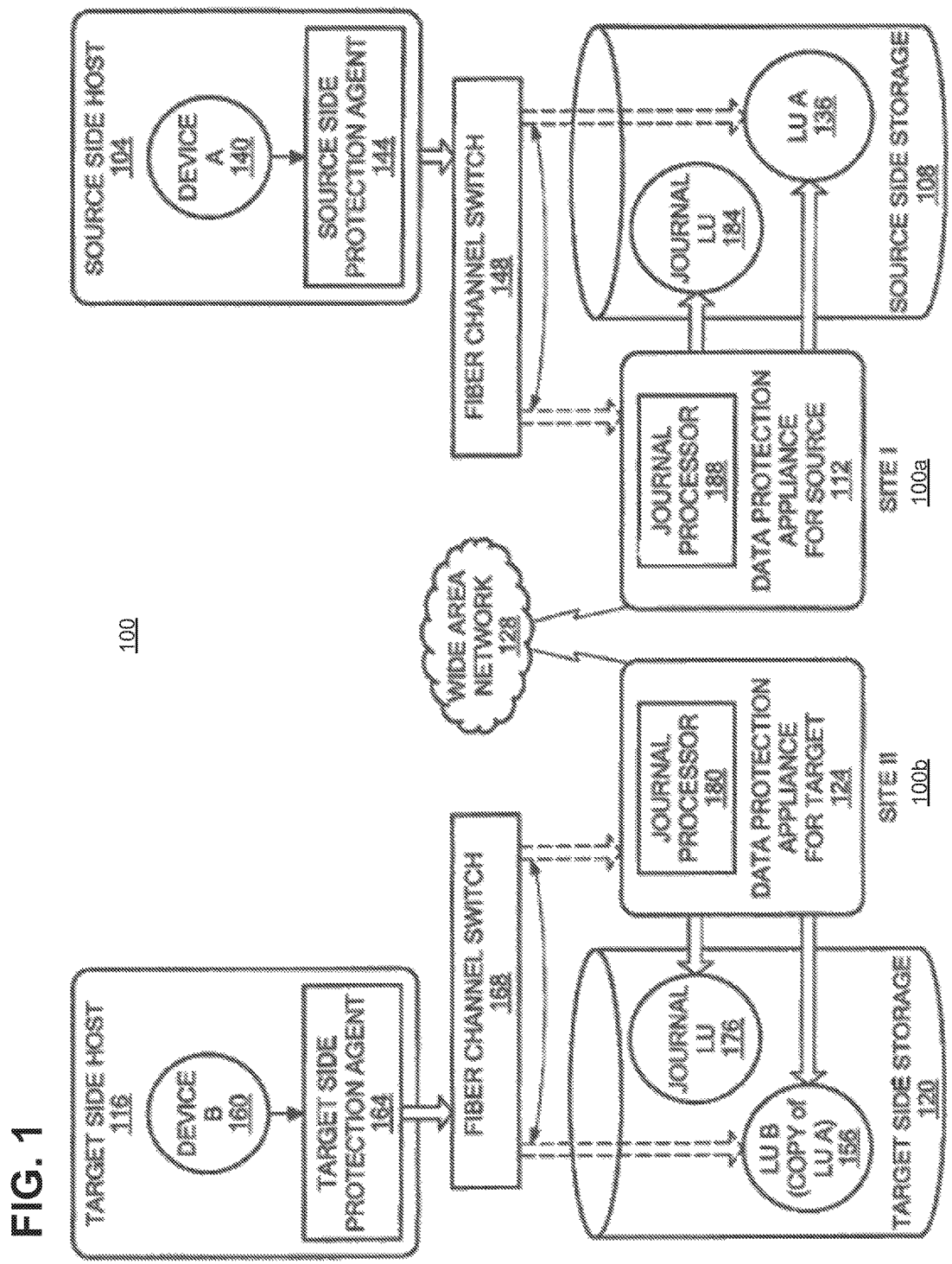
FIG. 1 is a block diagram of a data protection system, in accordance with an illustrative embodiment.

Referring to the illustrative embodiment shown in FIG. 1, data protection system 100 may include two sites, Site I 100a and Site II 100b, which communicate via a wide area network (WAN) 128, such as the Internet. In some embodiments, under normal operation, Site I 100a may correspond to a source or production site (i.e., the transmitter within a data replication workflow) of system 100 and Site II 100b may be a target or replication site (i.e., the receiver within a data replication workflow) of data protection system 100. Thus, during normal operations, the direction of replicated data flow may be from Site I 100a to Site II 100b.

In certain embodiments, Site I 100a and Site II 100b may be remote from one another. In other embodiments, Site I 100a and Site II 100b may be local to one another and may be connected via a local area network (LAN). Local data protection may have the advantage of minimizing data lag between target and source, and remote data protection may have the advantage of being robust in the event that a disaster occurs at the source site.

In particular embodiments, data protection system 100 may include a failover mode of operation, wherein the direction of replicated data flow is reversed. For example, Site I 100a may behave as a target site and Site II 100b may behave as a source site. Failover may be triggered either manually (e.g., by a user) or automatically and may be performed in the event of a disaster at Site I 100a. In some embodiments, both Site I 100a and Site II 100b may behave as source site for some stored data and may behave simultaneously as a target site for other stored data. A portion of stored data may be replicated from one site to the other, and another portion may not be replicated.

Site I 100a may correspond to a production site (e.g., a facility where one or more hosts run data processing applications that write data to a storage system and read data from the storage system) and Site II 100b may correspond to a backup or replica site (e.g., a facility where replicated production site data is stored). In such embodiments, Site II 100b may be responsible for replicating production site data and may enable rollback of data of Site I 100a to an earlier point in time. Rollback may be used in the event of data corruption of a disaster, or alternatively in order to view or to access data from an earlier point in time.

As shown in FIG. 1, Site I 100a may include a source host 104, a source storage system (or "storage array") 108, and a source data protection appliance (DPA) 112 coupled via a first storage area network (SAN). Similarly, Site II 100b may include a target host 116, a target storage system 120, and a target DPA 124 coupled via a second SAN. In some embodiments, each SAN may include one or more devices (or "nodes") that may be designated an "initiator," a "target", or both. For example, the first SAN may include a first fiber channel switch 148 and the second SAN may include a second fiber channel switch 168. Communication links between each host 104 and 116 and its corresponding storage system 108 and 120 may be any appropriate medium suitable for data transfer, such as fiber communication channel links. A host may communicate with its corresponding storage system over a communication link, such as an InfiniBand (IB) link or Fibre Channel (FC) link, and/or a network, such as an Ethernet or Internet (e.g., TCP/IP) network that may employ, for example, the iSCSI protocol.

Each storage system 108 and 120 may include storage devices for storing data, such as disks or arrays of disks. Storage systems 108 and 120 may be target nodes. In order to enable initiators to send requests to storage system 108, storage system 108 may provide (e.g., expose) one or more logical units (LU) to which commands are issued. Thus, in some embodiments, storage systems 108 and 120 may be SAN entities that provide multiple logical units for access by multiple SAN initiators. An LU is a logical entity provided by a storage system for accessing data stored therein. A logical unit may be a physical logical unit or a virtual logical unit, and may be identified by a unique logical unit number (LUN).

In the embodiment shown in FIG. 1, storage system 108 may expose logical unit 136, designated as LU A, and storage system 120 exposes logical unit 156, designated as LU B. LU B 156 may be used for replicating LU A 136. As such, LU B 156 may be generated as a copy of LU A 136. In one embodiment, LU B 156 may be configured so that its size is identical to the size of LU A 136.

Source host 104 may generate a host device 140 ("Device A") corresponding to LU A 136 and source host 116 may generate a host device 160 ("Device B") corresponding to LU B 156. A host device may be a logical entity within a host through which the host may access an LU. In some embodiments, an operating system of a host may generate a host device for each LU exposed by the storage system in the host SAN.

Source host 104 may act as a SAN initiator that issues I/O requests through host device 140 to LU A 136 using, for example, SCSI commands. In some embodiments, such requests may be transmitted to LU A 136 with an address that includes a specific device identifier, an offset within the device, and a data size.

Source DPA 112 and target DPA 124 may perform various data protection services, such as data replication of a storage system, and journaling of I/O requests issued by hosts 104 and/or 116. When acting as a target DPA, a DPA may also enable rollback of data to an earlier point-in-time (PIT), and enable processing of rolled back data at the target site. In some embodiments, each DPA 112 and 124 may be a physical device, a virtual device, or may be a combination of a virtual and physical device.

In some embodiments, a DPA may be a cluster of such computers. Use of a cluster may ensure that if a DPA computer is down, then the DPA functionality switches over to another computer. In some embodiments, the DPA computers within a DPA cluster may communicate with one another using at least one communication link suitable for data transfer, for example, an InfiniBand (IB) link, a Fibre Channel (FC) link, and/or a network link, such as an Ethernet or Internet (e.g., TCP/IP) link to transfer data via fiber channel or IP based protocols, or other such transfer protocols. In some embodiments, one computer from the DPA cluster may serve as the DPA leader. The DPA cluster leader may coordinate between the computers in the cluster, and may also perform other tasks that require coordination between the computers, such as load balancing.

In certain embodiments, a DPA may be a standalone device integrated within a SAN. Alternatively, a DPA may be integrated into storage system. The DPAs communicate with their respective hosts through communication links suitable for data transfer, for example, an InfiniBand (IB) link, a Fibre Channel (FC) link, and/or a network link, such as an Ethernet or Internet (e.g., TCP/IP) link to transfer data via, for example, SCSI commands or any other protocol.

In various embodiments, the DPAs may act as initiators in the SAN. For example, the DPAs may issue I/O requests using, for example, SCSI commands, to access LUs on their respective storage systems. Each DPA may also be configured with the necessary functionality to act as targets, e.g., to reply to I/O requests, such as SCSI commands, issued by other initiators in the SAN, including their respective hosts. In some embodiments, being target nodes, the DPAs may dynamically expose or remove one or more LUs. As described herein, Site I 100a and Site II 100b may each behave simultaneously as a production site and a backup site for different logical units. As such, DPA 112 and DPA 124 may each behave as a source DPA for some LUs and as a target DPA for other LUs, at the same time.

In the example embodiment shown in FIG. 1, hosts 104 and 116 include protection agents 144 and 164, respectively. Protection agents 144 and 164 may intercept commands (e.g., SCSI commands) issued by their respective hosts to LUs via host devices (e.g., host devices 140 and 160). In some embodiments, a protection agent may act on intercepted SCSI commands issued to a logical unit in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. In some embodiments, protection agents 144 and 164 may handle different SCSI commands differently, according to the type of the command. For example, a SCSI command inquiring about the size of a certain LU may be sent directly to that LU, whereas a SCSI write command may be split and sent first to a DPA within the host's site.

A protection agent may change its behavior for handling SCSI commands, for example as a result of an instruction received from the DPA. For example, the behavior of a protection agent for a certain host device may depend on the behavior of its associated DPA with respect to the LU of the host device. When a DPA behaves as a source site DPA for a certain LU, then during normal course of operation, the associated protection agent may split I/O requests issued by a host to the host device corresponding to that LU. Similarly, when a DPA behaves as a target device for a certain LU, then during normal course of operation, the associated protection agent fails I/O requests issued by host to the host device corresponding to that LU.

Communication between protection agents 144 and 164 and a respective DPA 112 and 124 may use any protocol suitable for data transfer within a SAN, such as fiber channel, SCSI over fiber channel, or other protocols. The communication may be direct, or via a logical unit exposed by the DPA.

In certain embodiments, protection agents may be drivers located in their respective hosts. Alternatively, in some embodiments, a protection agent may also be located in a fiber channel switch, or in any other device situated in a data path between a host and a storage system or on the storage system itself. In some embodiments, in a virtualized environment, the protection agent may run at the hypervisor layer or in a virtual machine providing a virtualization layer.

Figure 2:
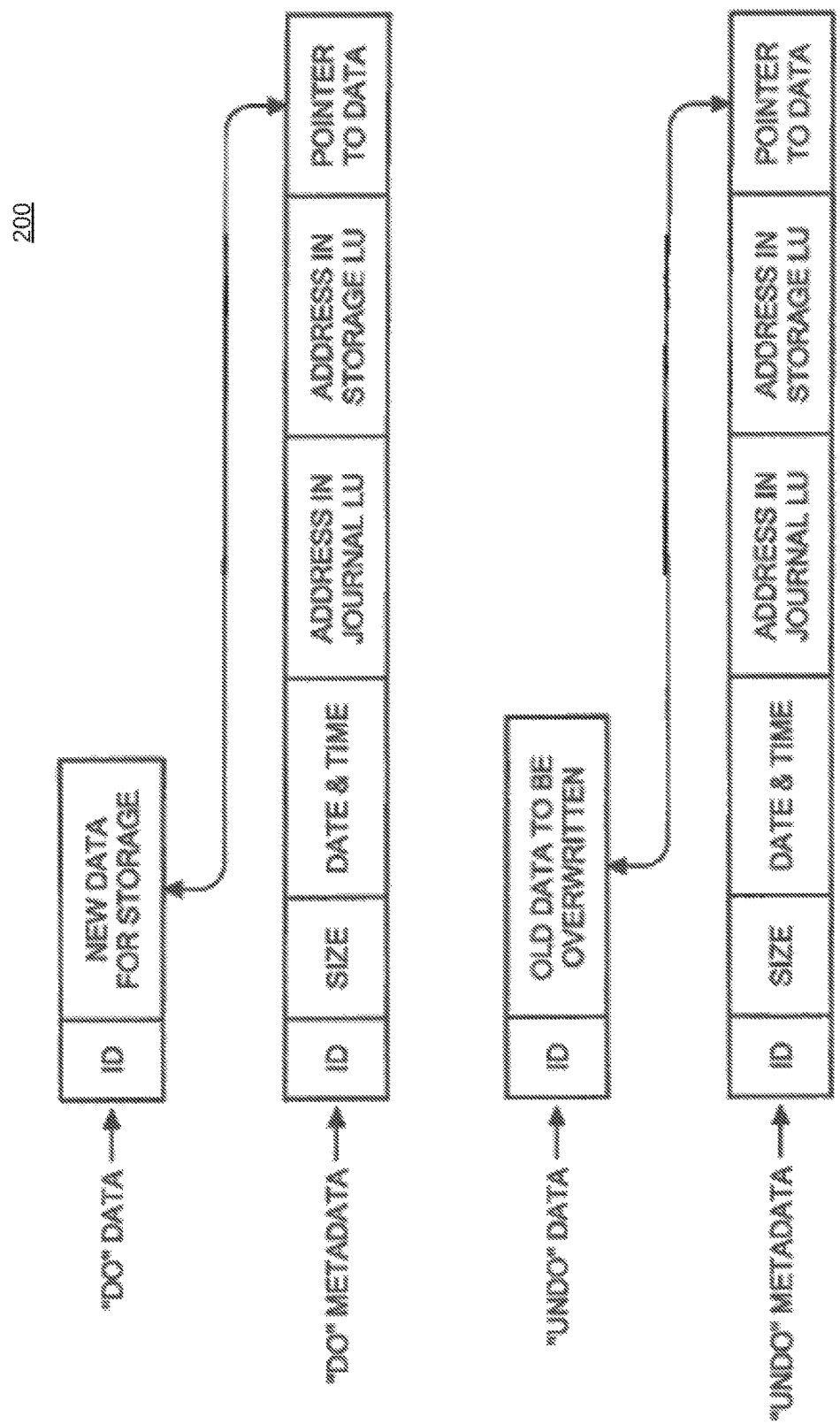
FIG. 2 is a diagram illustrating a journal history of write transactions for the data protection system of FIG. 1, in accordance with an illustrative embodiment.

As shown in the example embodiment shown in FIG. 1, target storage system 120 may expose a journal LU 176 for maintaining a history of write transactions made to LU B 156, referred to herein as a "journal." A journal may be used to provide access to storage at specified points-in-time (PITs), as discussed in greater detail in regard to FIG. 2. In some embodiments, the journal may be stored across multiple LUs (e.g., using striping, etc.). Target DPA 124 may include a journal processor 180 for managing the journal within journal LU 176.

In some embodiments, journal processor 180 may manage the journal entries of LU B 156. For example, journal processor 180 may enter write transactions received by the target DPA 124 from the source DPA 112 into the journal by writing them into journal LU 176, read the undo information for the transaction from LU B 156, update the journal entries in journal LU 176 with undo information, apply the journal transactions to LU B 156, and remove already-applied transactions from the journal. In one embodiment, journal processor 180 may perform processing such as described in U.S. Pat. No. 7,516,287, issued Apr. 7, 2009 and entitled "Methods and Apparatus for Optimal Journaling for Continuous Data Replication," which is hereby incorporated by reference herein. Other embodiments may not employ thin devices and tracking regions for replication, and may instead replicate write transactions using an array's native snapshot capabilities.

Some embodiments of data protection system 100 may be provided as physical systems for the replication of physical LUs, or as virtual systems for the replication of virtual LUs. For example, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In normal operation (sometimes referred to as "production mode"), described embodiments of DPA 112 may act as a source DPA for LU A 136. Thus, protection agent 144 may act as a source protection agent, specifically by splitting I/O requests to host device 140 ("Device A"). Protection agent 144 may send an I/O request to source DPA 112 and, after receiving an acknowledgement from source DPA 112, may send the I/O request to LU A 136. After receiving an acknowledgement from storage system 108, host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to target DPA 124 for journaling and for incorporation within target storage system 120. When applying write operations to storage system 120, target DPA 124 may act as an initiator, and may send SCSI commands to LU B 156.

In some embodiments, source DPA 112 may send its write transactions to target DPA 124 using a variety of modes of transmission, including (i) a synchronous mode, (ii) an asynchronous mode, and (iii) a snapshot mode.

In synchronous mode, source DPA 112 may send each write transaction to target DPA 124, may receive back an acknowledgement from the target DPA 124, and in turn may send an acknowledgement back to protection agent 144. Protection agent 144 may wait until receipt of such acknowledgement before sending the I/O request to LU 136.

In asynchronous mode, source DPA 112 may send an acknowledgement to protection agent 144 upon receipt of each I/O request, before receiving an acknowledgement back from target DPA 124.

In snapshot mode, source DPA 112 may receive several I/O requests and combine them into an aggregate "snapshot" or "batch" of write activity performed in the multiple I/O requests, and may send the snapshot to target DPA 124 for journaling and incorporation in target storage system 120. Source DPA 112 may send an acknowledgement to protection agent 144 upon receipt of each I/O request, before receiving an acknowledgement back from target DPA 124.

As described herein, a snapshot replica may be a differential representation of a volume. For example, the snapshot may include pointers to the original volume, and may point to log volumes for locations of the original volume that store data changed by one or more I/O requests. Snapshots may be combined into a snapshot array, which may represent different images over a time period (e.g., for multiple PITs).

As described herein, in normal operation, LU B 156 may be used as a backup of LU A 136. As such, while data written to LU A 136 by host 104 is replicated from LU A 136 to LU B 156, target host 116 should not send I/O requests to LU B 156. To prevent such I/O requests from being sent, protection agent 164 may act as a target site protection agent for host device B 160 and may fail I/O requests sent from host 116 to LU B 156 through host device B 160. In a recovery mode, target DPA 124 may undo the write transactions in journal LU 176 so as to restore the target storage system 120 to an earlier state.

Referring to FIG. 2, an illustrative write transaction 200 may be included within a journal and stored within a journal LU. In some embodiments, write transaction 200 may include one or more identifiers; a time stamp indicating the date and time at which the transaction was received by the source DPA; a write size indicating the size of the data block; a location in the journal LU where the data is entered; a location in the target LU where the data is to be written; and the data itself.

Referring to both FIGS. 1 and 2, transaction 200 may correspond to a transaction transmitted from source DPA 112 to target DPA 124. In some embodiments, target DPA 124 may record write transaction 200 in the journal that includes four streams. For example, a first stream, referred to as a "DO" stream, may include a copy of the new data for writing to LU B 156. A second stream, referred to as a "DO METADATA" stream, may include metadata for the write transaction, such as an identifier, a date and time, a write size, the offset within LU B 156 where the new data is written, and a pointer to the offset in the DO stream where the corresponding data is located. A third stream, referred to as an "UNDO" stream, may include a copy of the data being overwritten within LU B 156 (referred to herein as the "old" data). A fourth stream, referred to as an "UNDO METADATA" stream, may include an identifier, a date and time, a write size, a beginning address in LU B 156 where data was (or will be) overwritten, and a pointer to the offset in the UNDO stream where the corresponding old data is located.

In such embodiments, since the journal contains the "undo" information necessary to rollback storage system 120, data that was stored in specific memory locations at a specified point in time may be obtained by undoing write transactions that occurred subsequent to such point in time (PIT). Each of the four streams may hold a plurality of write transaction data. As write transactions are received dynamically by the target DPA, the write transactions may be recorded at the end of the DO stream and the end of the DO METADATA stream, prior to performing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Some described embodiments may validate that point-in-time (PIT) data replicas (e.g., data replicated to LU B 156) are valid and usable, for example to verify that the data replicas are not corrupt due to a system error or inconsistent due to violation of write order fidelity. Validating data replicas can be important, for example, in data replication systems employing incremental backup where an undetected error in an earlier data replica may lead to corruption of future data replicas.

In some conventional systems, validating data replicas can increase the journal lag for a transaction, which may increase a recovery time objective (RTO) of the data protection system (e.g., an elapsed time between replicas or PITs). In such conventional systems, if the journal lag time is significant, the journal may become full and unable to account for data changes due to subsequent transactions. Further, in such conventional systems, validating data replicas may consume system resources (e.g., processor time, memory, communication link bandwidth, etc.), resulting in reduced performance for system tasks.

Figure 3:
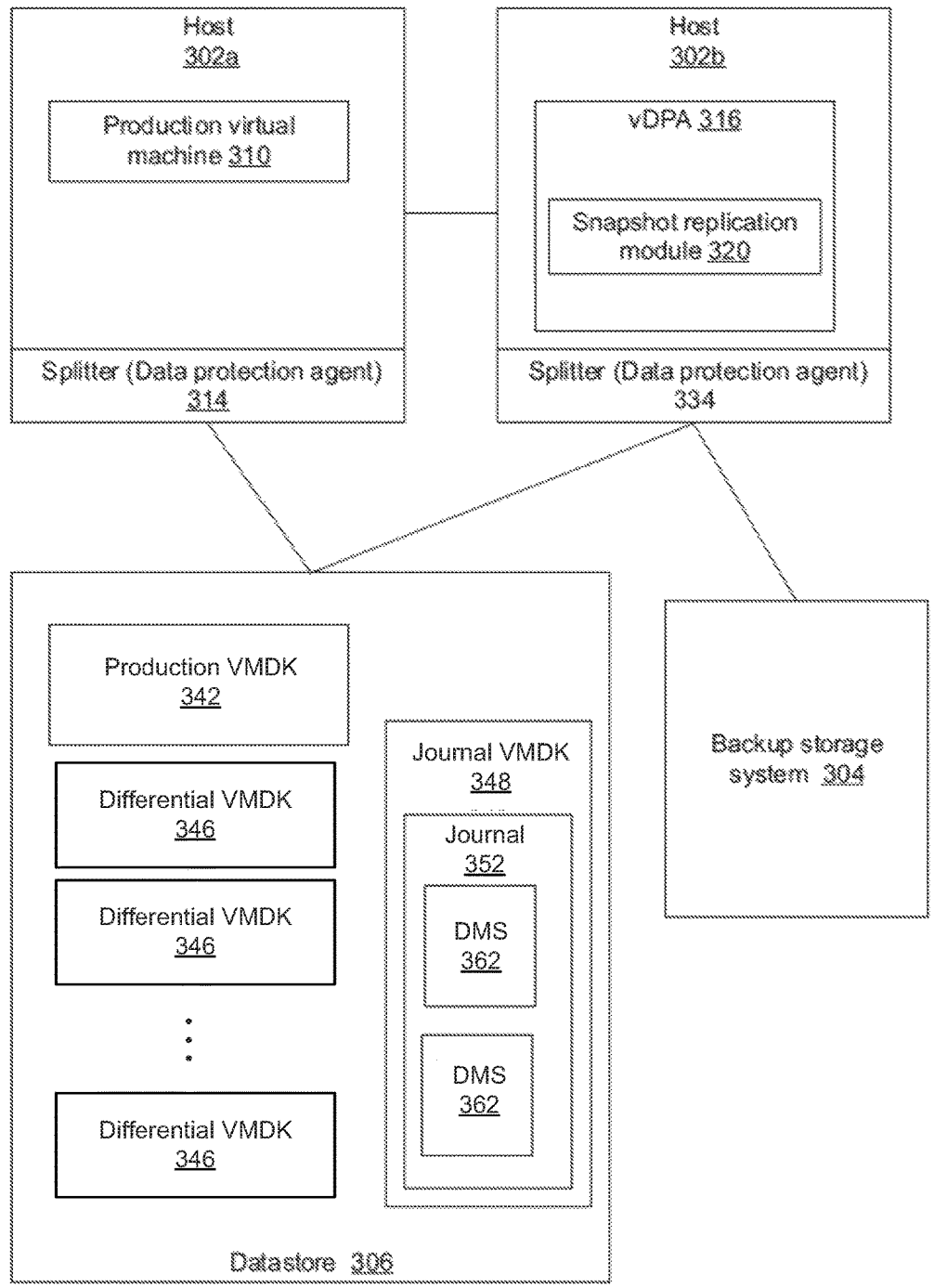
FIG. 3 is a block diagram of an example of a data protection system to perform snapshot replication on a storage system not configured to support snapshot replication, in accordance with an illustrative embodiment.

Referring to FIG. 3, in an illustrative embodiment, data protection system 300 may include host 302a, host 302b, backup storage system 304 (e.g., a deduplicated storage system) and a datastore 306. Host 302a may include production virtual machine 310 and splitter 314 (e.g., data protection agent 144 of FIG. 1). Host 302b may be a hypervisor and splitter 314 may operate either in the hypervisor kernel or in another layer in the hypervisor, which allows splitter 314 to intercept I/O requests sent from host 302a to one or more virtual machine disks (VMDKs) 342. Host 302b may include a virtual data protection appliance (e.g., DPA appliance 124 of FIG. 1) having snapshot replication module 320 and splitter 334 (e.g., data protection agent 164 of FIG. 1). Splitter 334 of host 302b enables protection of virtual machines on the host 302b. Splitter 334 of host 302b may also provide faster access to VMDKs 342 from virtual DPA (vDPA) 316.

As shown in FIG. 3, datastore 306 may include one or more production virtual machine disks, shown as production VMDK 342, and one or more differential virtual machine disks, shown as differential VMDKs 346. Some embodiments of datastore 306 may also include journal virtual machine disk 348. In other embodiments, differential VMDKs 346 and journal VMDK 348 may be stored in a first datastore, and production virtual machine disk 342 may be stored in a separate datastore so that I/O accesses to the differential VMDKs does not affect performance of the production VMDKs.

The differential VMDKs 346 may be used to store differential snapshot data representative of changes that happened to data stored on production VMDK 342. In one example, a first differential VMDK 346 may include changes due to writes that occurred to production VMDK 342 from time t1 to time t2, a second differential VMDK 346 may include the changes due to writes that occurred to production VMDK 342 from time t2 to time t3, and so forth.

In some embodiments, differential VMDKs 346 may be thin provisioned. In such embodiments, thin provisioning may allocate storage space to volumes of a SAN in a flexible manner among multiple volumes based on a minimum space requirement for each volume at any given time.

In some embodiments, data protection system 100 may include one or more consistency groups. A consistency group may treat source volumes (e.g., production volumes) and target volumes (e.g., backup volumes) as a single logical entity for data replication and migration.

Journal 352 may be stored in journal VMDK 348. In some embodiments, journal 352 includes one or more delta marker streams (DMS) 362. Each DMS 362 may include metadata associated with data that may be different between one differential VMDK and another differential VMDK. In one example, DMS 362 may include metadata differences between a current copy of the production VMDK 342 and a copy currently stored in backup storage 304. In some embodiments, journal 352 does not include the actual data changes, but rather metadata associated with the changes. In some embodiments, the data of the changes may be stored in the differential VMDKs. Thus, some embodiments may operate employing thin volumes to perform data replication by tracking regions for replications with the thin devices, as described herein. Other embodiments may operate to replicate data directly (e.g., without employing thin devices) from a source storage to a target (or replica) storage.

Although not shown in FIG. 3, in some embodiments, host 302b, datastore 306 and backup storage system 304 may be integrated into a single device, such as an integrated protection appliance to backup and protect production data.

As described here, data protection systems may employ continuous replication and/or snapshot replication to protect production data. For example, in continuous replication, every write I/O to a production volume is intercepted and sent to both the production volume and a replica volume. Thus, continuous replication may provide a very low Recovery Point Objective (RPO), meaning that data on a replica volume lags data on the production volume by only a short time period (e.g., a few seconds). RPO may be an amount of data that the user is willing to lose in case of production disaster (e.g., an amount of time between replications). At the extreme case, synchronous continuous replication may provide an RPO of zero (e.g., data on the replica volume is the same as data on the production volume). Further, continuous replication may provide high granularity of points in time (PITs) for restoring a production volume (e.g., since continuous replication may generate a replica each time there is a write operation to the production volume).

In continuous replication, data is sent to the replica "inline" (e.g., as part of the write operation), thus, in continuous replication it may be unnecessary to read data from the production volume to generate a replica. However, since every write operation sent to the production volume is also sent to the replica volume, network bandwidth requirements of continuous replication can be high (e.g., as high as the bandwidth of peak writes to the production volume).

In snapshot replication, snapshot replicas of a production volume are periodically generated after a time interval (e.g., the snapshot interval), and changes in data may be tracked between consecutive snapshot replicas. For example, one or more write operations may modify data on the production volume between generation of snapshot replicas. In some embodiments, regions of the production volume that are modified, and the changed data written to the regions, may be tracked. When a new snapshot replica is generated, modified regions may be read from the production volume and sent to the replica volume.

If there were numerous overwrites to the same region during a given snapshot interval, these changes may be "batched" or "folded" such that only the final content of the region is sent to the replica volume. In such embodiments, the bandwidth required for snapshot replication can be lower than then bandwidth required for continuous replication since less data is sent to the replica volume. However, this reduction in required bandwidth may be at the expense of providing longer RPOs than continuous replication and, thus, larger granularity of PITs that can be recovered (e.g., the lag between replicas may be large, for example, several minutes or hours). Further, snapshot replication may require storage space to track changes between snapshots and reading modified data from the production volume, which may delay user access to the production volume. Some embodiments may employ a hybrid replication mode that combines elements of snapshot replication and elements of continuous replication, for example, as described in U.S. patent application Ser. No. 15/274,362 entitled "Hybrid Continuous and Snapshot Replication in a Storage System" filed on Sep. 23, 2016 and U.S. patent application Ser. No. 15/275,677 entitled "Multilevel Snapshot Replication for Hot and Cold Regions of a Storage System" filed on Sep. 26, 2016, both of which are assigned to EMC IP Holding Company LLC, and both of which are hereby incorporated by reference herein. Such hybrid replication may perform continuous replication for some regions of the production volume and snapshot replication for other regions of the production volume, for example based upon usage characteristics of the regions (e.g., based on how often the region is accessed, a priority associated with the region, etc.). Every I/O that is continuously replicated reduces the size of the next snapshot, and reduces the read overhead from the production volume when the next snapshot is generated (e.g., at the end of a current snapshot interval).

As will be described, some embodiments may perform hybrid replication (e.g., hybrid snapshot and continuous replication) based upon properties of one or more received write requests (or I/Os) and system conditions. For example, each received I/O may be processed to determine properties of the I/O, such as compressibility of the I/O, deduplication ability of the I/O, alignment of the I/O to segments of the storage volume, and other properties of each I/O. Further, as I/Os are received, system conditions may be determined, such as bandwidth usage, production volume processing load, replication volume processing load, replication volume storage availability, and other system conditions. For example, storage volume usage conditions may be determined whether certain regions of the production volume are frequently accessed and overwritten (e.g., hot regions or hotspots) or other regions are infrequently accessed and overwritten (e.g., cold regions or cold spots), and adjust replication based upon usage of individual regions of the production volume (e.g., frequently accessed regions may be replicated by snapshots, while infrequently accessed regions may be replicated continuously). Thus, in described embodiments, real-time properties of received I/Os and real-time operating conditions of the storage system may be considered to dynamically update replication settings of the storage system.

As will be described, some embodiments may determine a score or rating for each received I/O. This score or rating may then be used to classify I/Os for either continuous replication or snapshot replication. For example, the score may be based upon the determined properties of the I/O and/or the determined system conditions. The score may be compared to one or more classification thresholds to determine whether continuous replication or snapshot replication should be employed. For example, the classification threshold(s) may be based upon the determined system conditions. In some embodiments, the score of each I/O and the classification threshold(s) may be dynamically adjusted to adjust the replication settings of the storage system in real time. Thus, described embodiments may assign a score to each received I/O. The assigned score may depend upon properties of the I/O and on system conditions at the time the I/O is received. The classification threshold dynamically determines a mixture between snapshot replication and continuous replication over operating time of the storage system.

As described herein, in some embodiments, a higher score for an I/O may indicate that the I/O is more suitable for continuous replication and a lower score for an I/O may indicate that the I/O is more suitable for snapshot replication. However, other embodiments may employ a lower score for an I/O to indicate that the I/O is more suitable for continuous replication and a higher score for an I/O to indicate that the I/O is more suitable for snapshot replication. In embodiments, scores may be normalized within a specific range such as 0 to 1 or 0 to 100, for example. It is understood that any suitable range can be used and that other embodiments may use other scoring arrangements.

As described, various properties may affect the score of each I/O and/or the classification threshold. For example, such properties may include I/O compressibility, I/O deduplication ability, I/O alignment to the storage volume, bandwidth balancing, priority of the I/O (or priority of a consistency group associated with the I/O), work load of the production volume, work load of the replication volume, storage space availability of the replication volume, and usage patterns of the production volume. In embodiments, the replication system may perform analytics on the raw data of the incoming throughput and/or on the characteristics of the environment, such as back-end storage array capabilities and communication channels bandwidth, to adapt the values for the IO scores and thresholds as described herein, for example, by following rules in order to achieve desirable replication results, e.g., low RPO with low WAN utilization, low read overhead on the production array, and the like.

Figure 4:
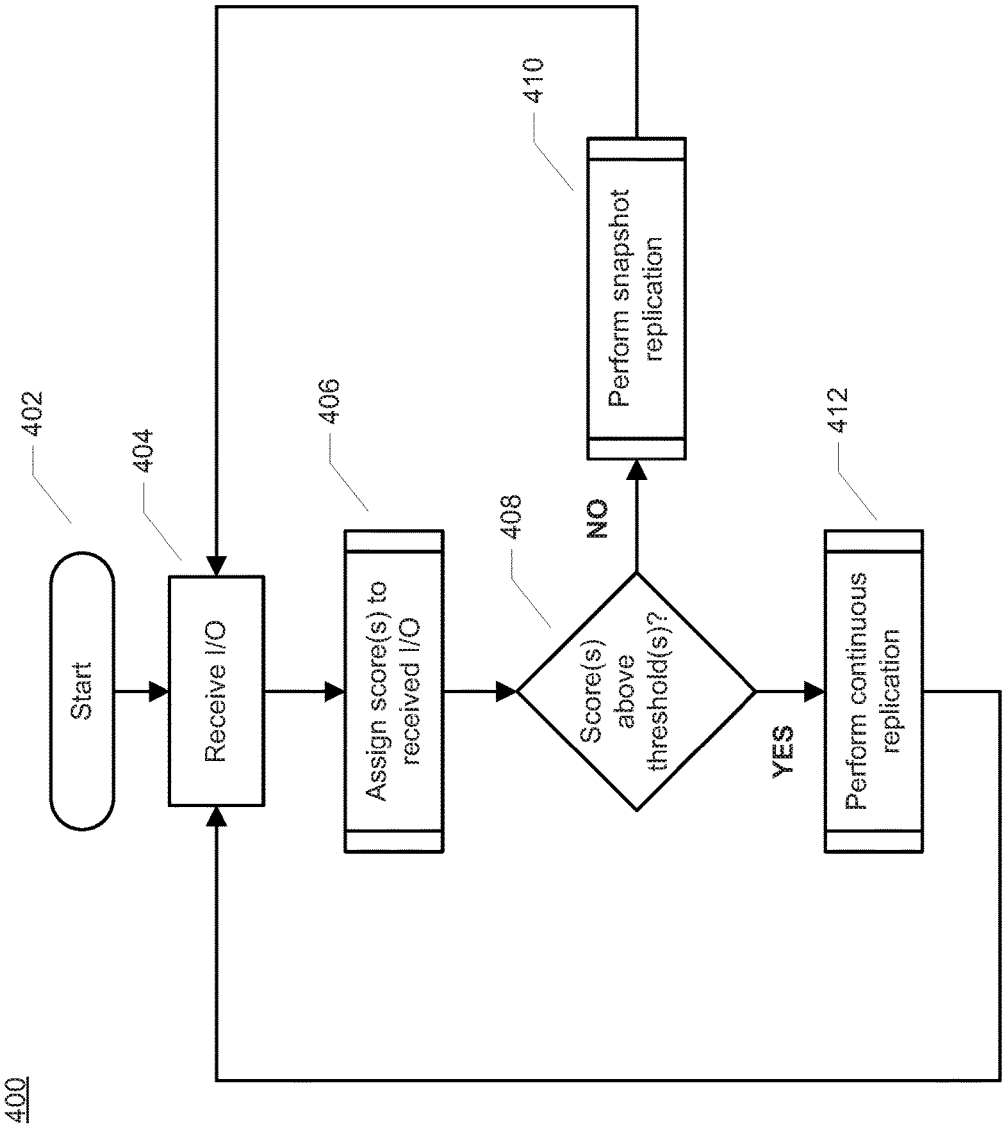
FIG. 4 is a flow diagram of an illustrative process to perform replication for a write request (I/O) to a production volume of a data protection system, in accordance with an illustrative embodiment.

Referring to FIG. 4, an illustrative process 400 for performing data replication is shown. In various embodiments, process 400 may be performed by the protection agent (e.g., protection agent 144 of FIG. 1) or by the data protection appliance (e.g., source DPA 112 of FIG. 1 or DPA 314 of FIG. 3) associated with the production volume. For example, process 400 might be performed whenever an I/O is received (e.g., by source side protection agent 144). At block 402, process 400 begins. At block 404, one or more I/Os are received (e.g., by source side protection agent 144). At block 406, the protection agent or DPA may assign one or more scores to each received I/O. Block 406 will be described in greater detail in regard to FIG. 5.

At block 408, if the score(s) assigned to a given I/O indicate that the given I/O is suitable for snapshot replication, then the given I/O may be replicated by snapshot replication at block 410. As described herein, one type of scoring may increase a score for an I/O the more suitable the I/O is for continuous replication, although other types of scoring may be employed. Thus, in some embodiments, at block 408, if the score(s) are not above associated threshold(s), then the given I/O may be replicated by snapshot replication at block 410. Process 400 may return to block 404 to process subsequently received I/Os. At block 408, if the score(s) assigned to a given I/O indicate that the given I/O is suitable for continuous replication, then the given I/O may be replicated by continuous replication at block 412. As described herein, one type of scoring may increase a score for an I/O the more suitable the I/O is for continuous replication, although other types of scoring may be employed. Thus, in some embodiments, at block 408, if the score(s) are above associated threshold(s), then the given I/O may be replicated by continuous replication at block 412. However, other embodiments may use a lower score (e.g., below a threshold) to determine to perform continuous replication and a higher score (e.g., at or above a threshold) to determine to perform snapshot replication. Some embodiments may employ a plurality of scores and thresholds. Process 400 may return to block 404 to process subsequently received I/Os.

Figure 5:
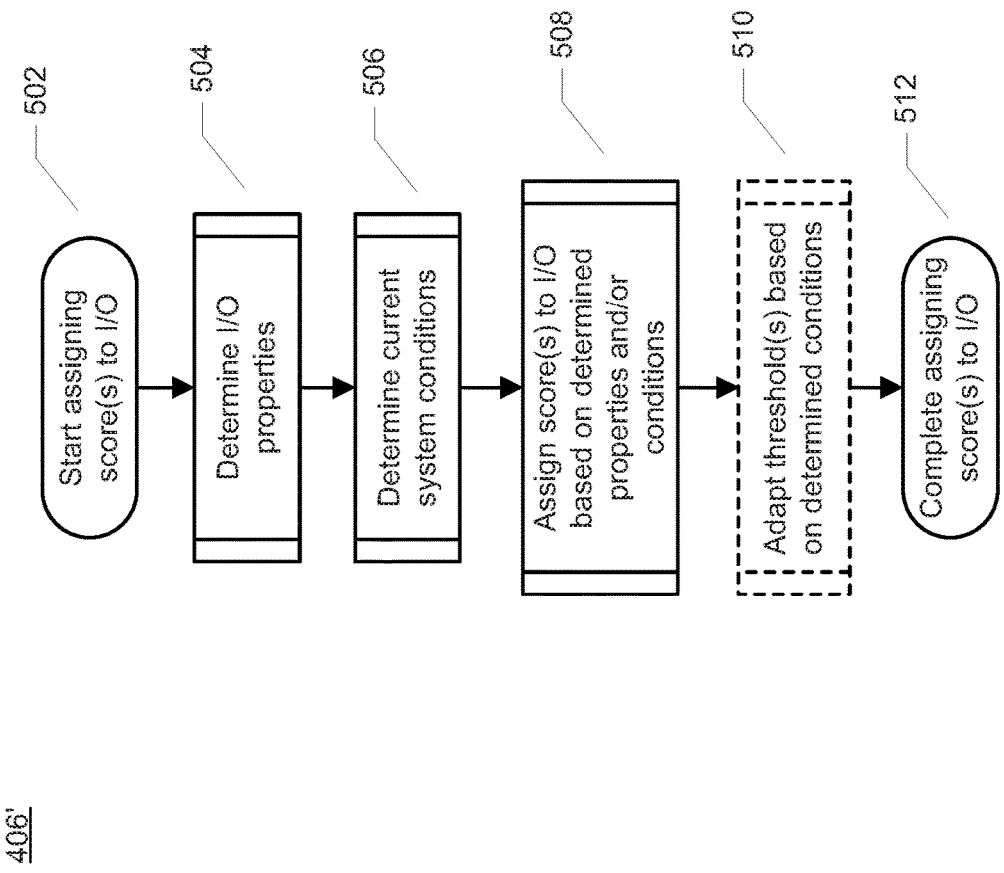
FIG. 5 is a flow diagram of an illustrative process to assign a score to the received I/O, in accordance with an illustrative embodiment.

Referring to FIG. 5, greater detail of block 406 of FIG. 4 for assigning score(s) to an I/O is shown as process 406'. At block 502, scoring process 406' begins. At block 504, one or more properties of a given I/O are determined. Block 504 is described in greater detail in regard to FIG. 6. At block 506, one or more current system conditions are determined. Block 506 is described in greater detail in regard to FIG. 7. At block 508, one or more scores are assigned to each received I/O based upon the determined one or more I/O properties and the determined one or more system conditions. Block 508 is described in greater detail in regard to FIG. 8. At block 510, one or more score thresholds may optionally be adapted, for example based upon the determined one or more system conditions. Block 510 is described in greater detail in regard to FIG. 9. At block 512, process 406' completes.

Figure 6:
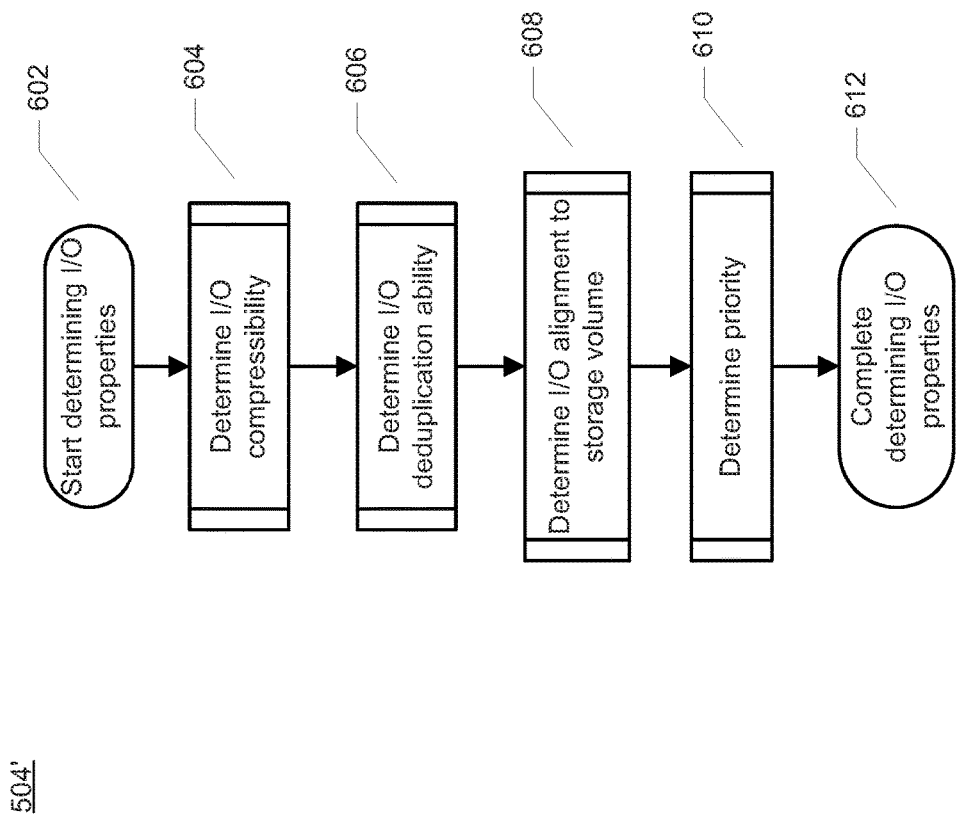
FIG. 6 is a flow diagram of an illustrative process to determine properties of the received I/O, in accordance with an illustrative embodiment.

Referring to FIG. 6, greater detail of block 504 of FIG. 5 is shown as illustrative process 504'. At block 602, process 504' begins. At block 604, compressibility of an I/O may be determined. For example, some embodiments may predict a compressibility of each received I/O. The more compressible the I/O is (e.g., the smaller the I/O data can be made), the better the I/O is for continuous replication since replicating the I/O will consume little bandwidth due to the small size. In some embodiments, the more compressible an I/O is, the higher the score the I/O is assigned. Block 604 is described in greater detail in regard to FIG. 10.

At block 606, the deduplication ability of each received I/O may be determined. I/O deduplication ability may be determined by the replication appliance (e.g., DPA 112) checking whether a given I/O is a duplicate of prior I/O(s). If the I/O is a duplicate, sending the I/O to replication volume consumes little WAN bandwidth as only a reference to the content is sent. Block 606 is described in greater detail in regard to FIG. 11.

At block 608, the alignment of the I/O to segments of the storage volume may be determined. For example, storage volumes, such as storage 108 and 120 of FIG. 1, may typically be arranged into one or more segments or blocks. For example, a given storage volume may include a plurality of physical blocks. A physical block may be an addressable unit where data may be written to and/or read (e.g., a sector or a page may be a smallest addressable unit of a volume).

A logical block may include one or more contiguous (or consecutive) physical blocks. In an illustrative embodiment, each block may be an 8 KB page, although other sizes may be employed, such as a 512 byte sector, 2 KB or 4 KB pages, or other sizes. Thus, some storage volumes may support fixed-size (e.g., 8 KB) data blocks starting at address 0. An aligned I/O would then have a size that is an integer multiple of the block size (e.g., an integer multiple of 8 KB) and has a starting address (e.g., offset) that is aligned to an integer multiple of the block size (e.g., an integer multiple of 8 KB). An unaligned I/O might start at a starting address (e.g., offset) that is not aligned to an integer multiple of the block size and/or have a size that is not an integer multiple of the block size. Many storage systems process I/Os that are aligned to segment or block boundaries of the storage media faster than I/Os that are not aligned to the segment or block boundaries of the storage media. Block 608 is described in greater detail in regard to FIG. 12.

At block 610, a priority level associated with the I/O may be determined. For example, some embodiments may determine a consistency group (CG) priority in assigning a score to an I/O. As described, a CG may be a group of production volumes and replication volumes that are treated as a single logical entity. Each I/O may be associated with a given CG (e.g., based upon an address of a write request, etc.). Some CGs may be assigned a priority level, for example because a given CG contains more critical data. Block 610 is described in greater detail in regard to FIG. 13. At block 612, process 504' completes.

Figure 7:
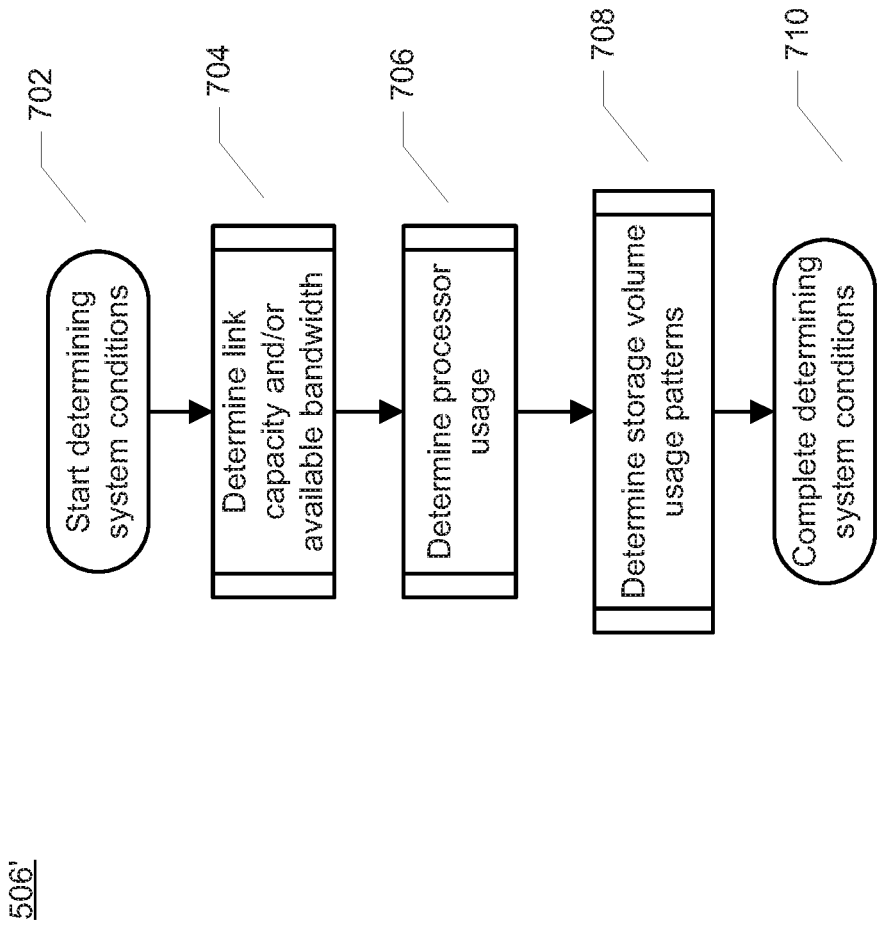
FIG. 7 is a flow diagram of an illustrative process to determine system conditions, in accordance with an illustrative embodiment.

Referring to FIG. 7, greater detail of block 506 of FIG. 5 is shown as illustrative process 506' for determining one or more current system conditions of data protection system 100. At block 702, process 506' begins. At block 704, a link capacity or available bandwidth of a communication link of data protection system 100 is determined. For example, a link capacity or available bandwidth may be determined of wide area network 128 or fiber channel switches 148 or 168.

At block 706, a processor usage (e.g., of a processor of host 104 and/or host 116) may be determined. The processor usage may be determined as, for example, a percentage value of total available processor capacity (e.g., between 0%, where the processor is idle, and 100%, where the processor is completely loaded).

At block 708, usage patterns of the storage volume may be determined. For example, some embodiments may determine how frequently given regions of the storage volume(s) are written. For example, some embodiments may determine how frequently volume regions are written similarly as described in U.S. patent application Ser. No. 15/274,362 entitled "Hybrid Continuous and Snapshot Replication in a Storage System" filed on Sep. 23, 2016 and U.S. patent application Ser. No. 15/275,677 entitled "Multilevel Snapshot Replication for Hot and Cold Regions of a Storage System" filed on Sep. 26, 2016, both of which are hereby incorporated by reference herein. Block 708 is described in greater detail in regard to FIG. 14. At block 710, process 506' completes.

Figure 8:
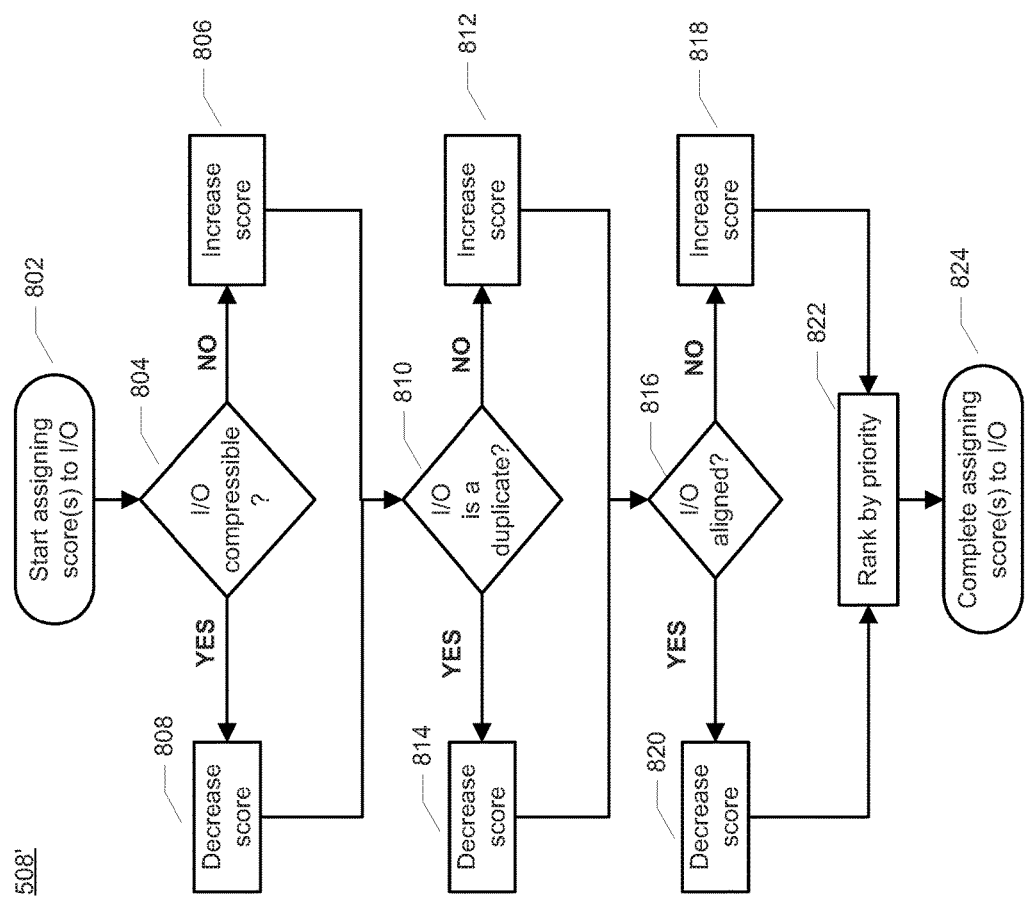
FIG. 8 is a flow diagram of an illustrative process to assign a score to an I/O, in accordance with an illustrative embodiment.

Referring to FIG. 8, greater detail of block 508 of FIG. 5 is shown as illustrative process 508' for assigning a score to a given I/O. At block 802, process 508' begins. At block 804, if the I/O is compressible, for example as determined at block 604 of FIG. 6, then the score may be adjusted such that incompressible I/Os are replicated by snapshot replication and compressible I/Os are replicated by continuous replication. For example, in an illustrative embodiment such as shown in FIG. 8, the score for an incompressible I/O may be increased at block 806 and the score for a compressible I/O may be decreased at block 808. However, as described herein, other types of scoring may be employed.

At block 810, if the I/O is a duplicate, or has deduplication ability, for example as determined at block 606 of FIG. 6, then the score may be adjusted such that a duplicate I/O is replicated by continuous replication and a non-duplicate I/O is replicated by snapshot replication. For example, in an illustrative embodiment such as shown in FIG. 8, the score for a non-duplicate I/O may be increased at block 812 and the score for a duplicate I/O may be decreased at block 814. However, as described herein, other types of scoring may be employed.

At block 816, if the I/O is aligned to storage segments of the storage volume(s), for example as determined at block 608 of FIG. 6, then the score may be adjusted such that an aligned I/O is replicated by continuous replication and a non-aligned I/O is replicated by snapshot replication. For example, in an illustrative embodiment such as shown in FIG. 8, the score for an un-aligned I/O may be increased at block 818 and the score for an aligned I/O may be decreased at block 820. However, as described herein, other types of scoring may be employed. At block 822, the scored I/Os may be sorted or ranked by priority, for example as determined at block 610 of FIG. 6. In some embodiments, the score for the I/Os may be adjusted based upon the determined priority, for example such that higher priority I/Os are replicated by continuous replication and lower priority I/Os are replicated by snapshot replication. At block 824, process 508' completes.

Figure 9:
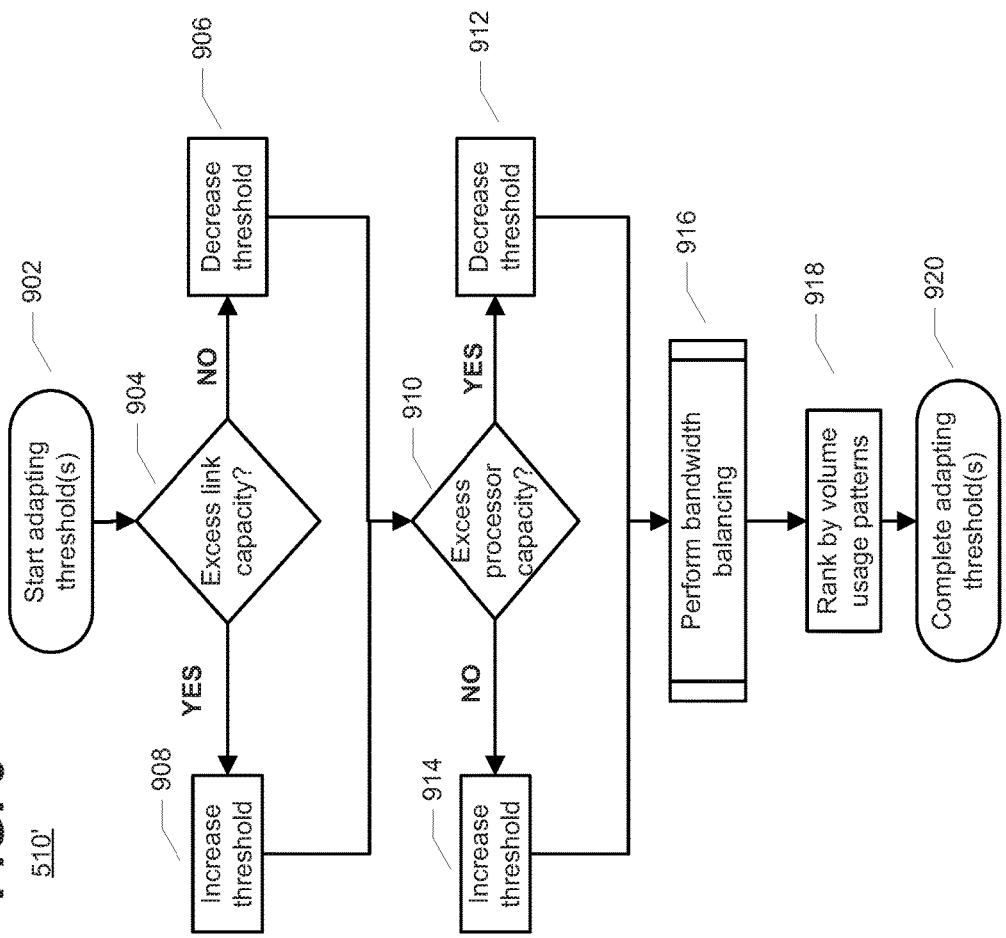
FIG. 9 is a flow diagram of an illustrative process to adapt thresholds of the data protection system, in accordance with an illustrative embodiment.

Referring to FIG. 9, greater detail of block 510 of FIG. 5 is shown as illustrative process 510' for adapting score threshold(s) of the data protection system. At block 902, process 510' begins. At block 904, if there is excess link capacity or bandwidth, for example as determined at block 704 of FIG. 7, then the score threshold(s) may be adapted such that more I/Os are replicated by continuous replication. For example, in an illustrative embodiment such as shown in FIG. 9, the score threshold may be increased at block 908 such that more I/Os are replicated continuously and fewer I/Os are replicated by snapshot replication. However, as described herein, other types of scoring may be employed. Similarly, at block 904, if there is not excess link capacity or bandwidth, for example as determined at block 704 of FIG. 7, then the score threshold(s) may be adapted such that fewer I/Os are replicated by continuous replication. For example, in an illustrative embodiment such as shown in FIG. 9, the score threshold may be decreased at block 906 such that fewer I/Os are replicated continuously and more I/Os are replicated by snapshot replication.

At block 910, if there is not excess processor capacity, e.g., production side processor capacity, for example as determined at block 706 of FIG. 7, then the score threshold(s) may be adapted such that more I/Os are replicated by continuous replication. For example, in an illustrative embodiment such as shown in FIG. 9, the score threshold may be increased at block 914 such that more I/Os are replicated continuously and fewer I/Os are replicated by snapshot replication. However, as described herein, other types of scoring may be employed. Similarly, at block 910, if there is excess processor capacity, for example as determined at block 706 of FIG. 7, then the score threshold(s) may be adapted such that fewer I/Os are replicated by continuous replication. For example, in an illustrative embodiment such as shown in FIG. 9, the score threshold may be decreased at block 912 such that fewer I/Os are replicated continuously and more I/Os are replicated by snapshot replication. It is understood that, in embodiments, if a production side processor is overloaded, then continuous replication may be preferred since IOs are replicated inline with little or no extra read IO load from the replication system. If the replication system processor is overloaded, then snap-based replication may temporarily decrease the load.

At block 916, bandwidth balancing may be performed. Block 916 is described in greater detail in regard to FIG. 15. At block 918, the thresholds may be adjusted based upon determined volume usage patterns (e.g., as determined at block 708 of FIG. 7). At block 920, process 510' completes.

Figure 10:
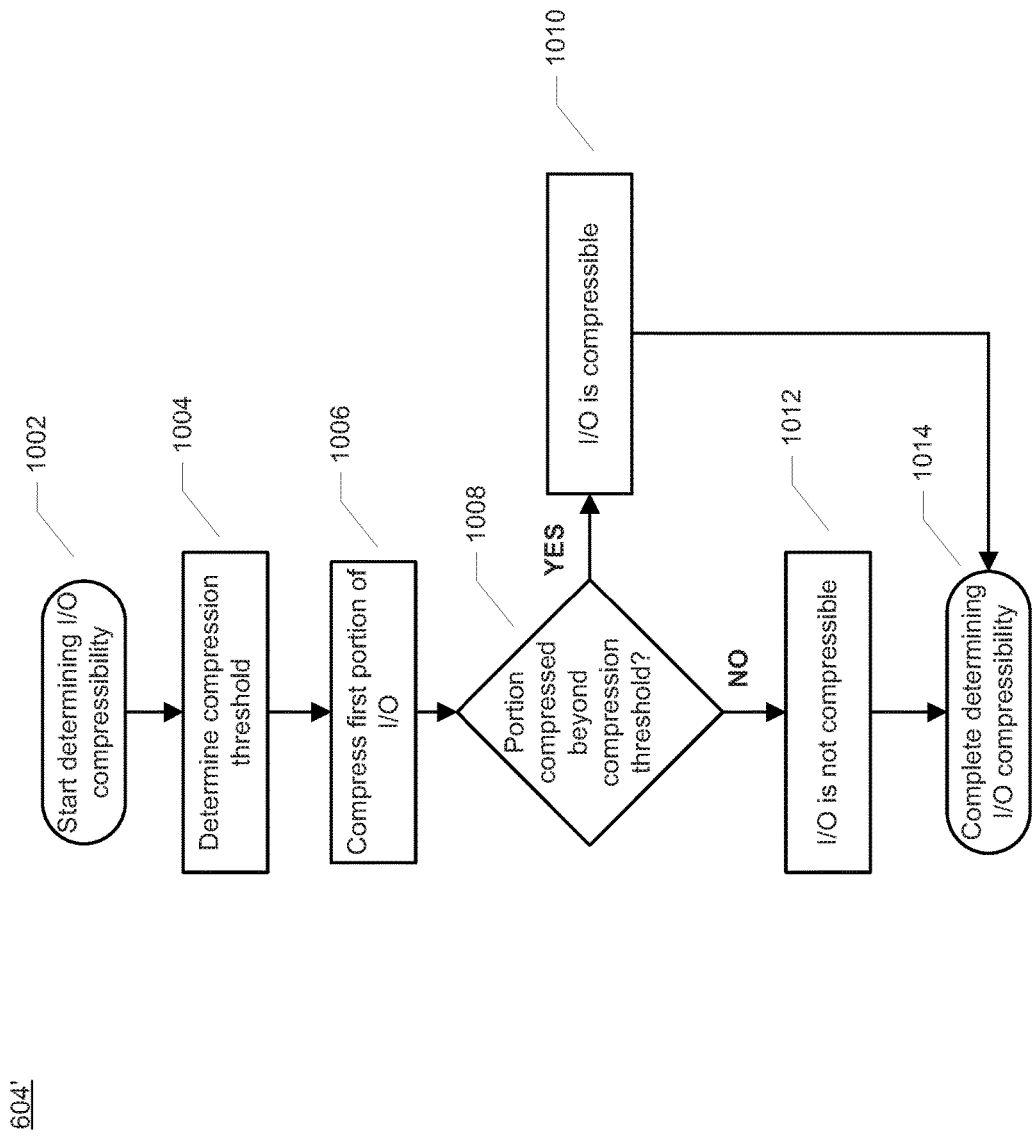
FIG. 10 is a flow diagram of an illustrative process to determine compressibility of an I/O, in accordance with an illustrative embodiment.

Referring to FIG. 10, greater detail of block 604 of FIG. 6 is shown as illustrative process 604'. Compressibility of an I/O may be determined in several ways. For example, in some embodiments, the storage system may natively compress data and provide compression information to the replication appliance (e.g., DPA 112) so that no extra compression work is necessary. One embodiment may compress the entire I/O and measure a difference in size between the compressed I/O and the uncompressed I/O to determine compression savings. However, other embodiments may employ predictive compression such that the compressibility of a portion of the I/O is employed to predict the compressibility of the overall I/O.

Predictive compression may be employed to determine whether a compression operation will reach one or more compression thresholds, and may stop performing compression if the compression operation is not likely to successfully reach at least one of the compression thresholds (e.g., if the size of a given data set is unlikely to reach a compression threshold after performing the compression operation). Predictive compression may reduce system resource consumption (e.g., processing capacity to perform compression) by reducing an amount of time spent performing compression operations on data sets that are uncompressible or cannot be sufficiently compressed.

As described, some embodiments may provide predictive compression that may predict whether a compression operation on a given set of I/O data is unlikely to successfully compress the given set of payload data beyond a compression threshold. For example, one manner of determining whether an I/O is compressible is to compress a first portion of the data and determine how much the data was compressed. As shown in FIG. 10, at block 1002, process 604' may begin. At block 1004, a compression threshold may be determined. For example, a goal compression level to achieve may be determined. At block 1006, a first portion of a given I/O may be compressed. At block 1008, if the first portion of the I/O was compressed to (or more than) the compression threshold, then at block 1010, the I/O is compressible. If, at block 1008, the first portion of the I/O was not compressed to the compression threshold, then at block 1012, the I/O is not compressible. At block 1014, process 604' completes.

As an example, if the I/O data is 16 KB and a first compression threshold is 8 KB, some embodiments may perform compression on a first amount of I/O data, such as 2 KB. After processing the first amount of I/O data, a likelihood may be determined whether the compression operation will reach at least one of compression thresholds. For example, if, after processing the first 2 KB of the 8 KB I/O data, the compression operation has only reduced the 2 KB I/O data to 1.9 KB of compressed I/O data, the achieved compression ratio is 1-(1.9/2)=5%. Based upon the achieved compression ratio, it may be determined that reaching the one or more compression thresholds is unlikely. For example, achieving only a 5% compression ratio for the entire 16 KB I/O data would reduce the I/O data from 16 KB to 15.2 KB, which would not reach the first compression threshold (8 KB). Thus, this particular I/O may be determined to not be compressible, and receive a low score since a poorly compressible I/O may be better suited for snapshot replication since a poorly compressible I/O may require a significant amount of bandwidth for replication. In addition, if poorly compressible I/O is replicated with a snapshot, it may be overwritten.

In other embodiments, compression prediction may be based on the compressibility of adjacent IOs. In further embodiments, it can be assumed that the overall compressibility is uniformly distributed, so it is possible to sample the compressibility of some of the IOs in order to determine if there is a point in compressing all of the IOs. It is understood that any suitable technique for compression prediction may be used.

Figure 11:
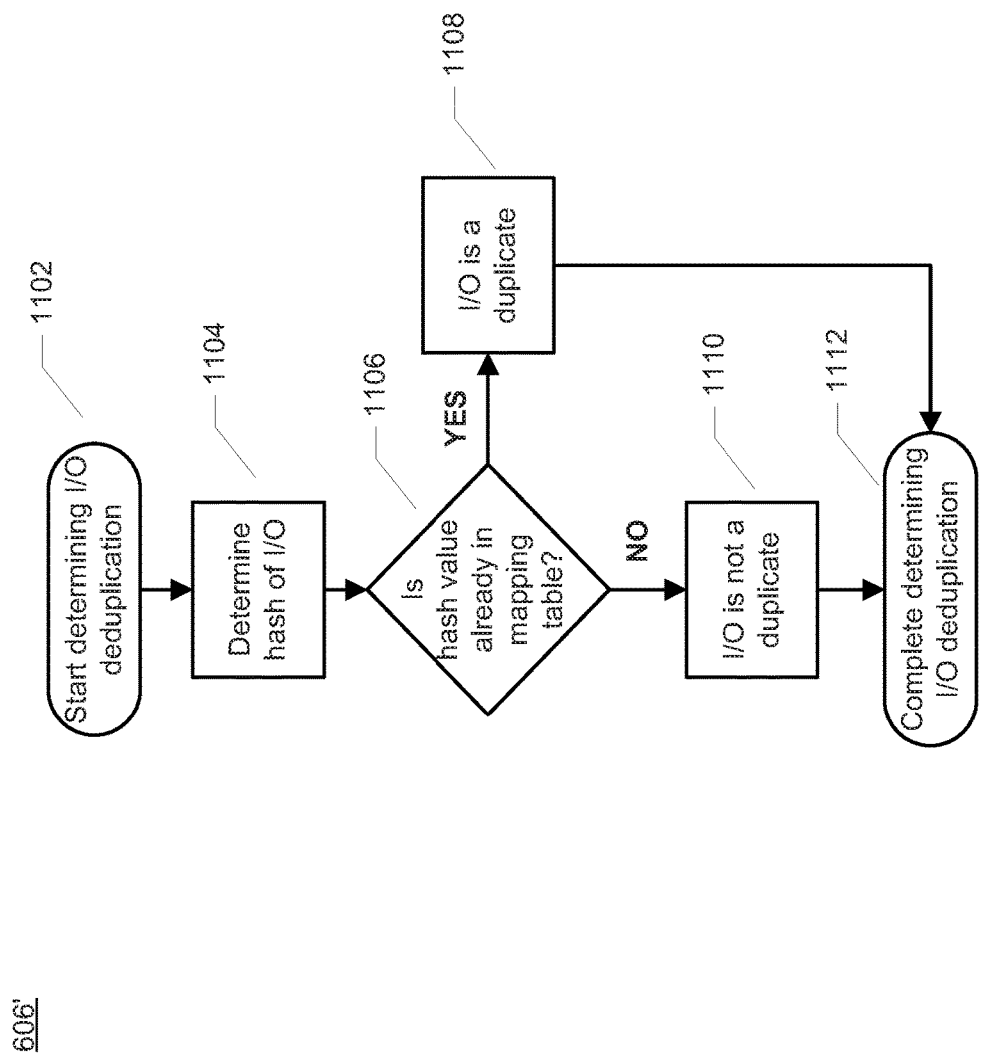
FIG. 11 is a flow diagram of an illustrative process to determine I/O deduplication, in accordance with an illustrative embodiment.

Referring to FIG. 11, greater detail of block 606 of FIG. 6 is shown as illustrative process 606' for determining deduplication ability of an I/O. At block 1102, process 606' starts. As described herein, I/O deduplication ability may be determined by the replication appliance (e.g., DPA 112) checking whether a given I/O is a duplicate of prior I/O(s). If the I/O is a duplicate, sending the I/O to replication volume consumes little WAN bandwidth as only a reference to the content is sent. For example, I/Os (or hash values of I/Os) may be tracked in a mapping table associated with a given storage volume. At block 1104, a hash value associated with a given I/O is determined. At block 1106, if a current I/O (or hash of the current I/O) is already stored in the mapping table, then at block 1108, the I/O is a duplicate, and only the hash value is sent to the replication volume. If, at block 1106, the current I/O (or hash of the current I/O) is not already stored in the mapping table, then at block 1110, the I/O is not a duplicate, and the entire data of the current I/O is sent to the replication volume. Therefore, a duplicate I/O may be determined to have high deduplication ability and receive a score indicating that the duplicate I/O is suitable for continuous replication since a duplicate I/O sends only a small amount of data to the replication volume. Similarly, a non-duplicate I/O may receive a score indicating that the non-duplicate I/O is suitable for snapshot replication since a non-duplicate I/O sends the entire I/O data to the replication volume.

Figure 12:
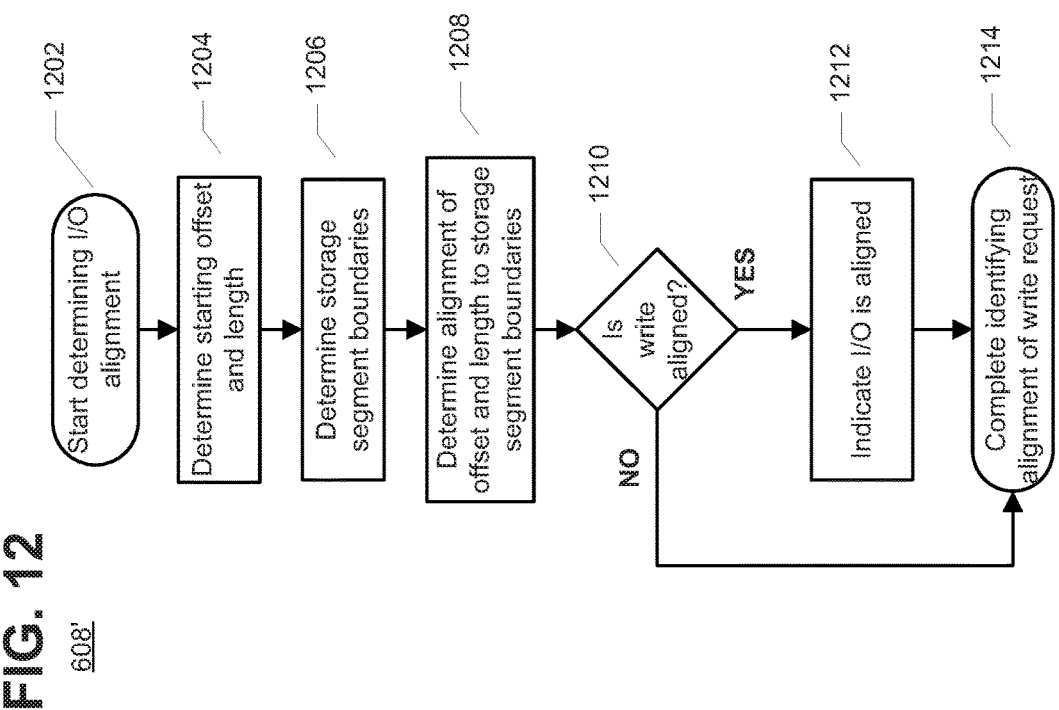
FIG. 12 is a flow diagram of an illustrative process to determine alignment of an I/O, in accordance with an illustrative embodiment.

Referring to FIG. 12, greater detail of block 608 of FIG. 6 is shown as illustrative process 608'. As described herein, some embodiments may determine alignment of I/O data to production volume segments in assigning a score to an I/O. For example, described embodiments may desirably replicate aligned I/Os using continuous replication, since the aligned I/Os can be written by the storage media quickly, and replicate unaligned I/Os using snapshot replication, since the unaligned I/Os may take longer to be written by the replication volume and there is an opportunity for multiple I/Os to the same segments or blocks to be coalesced into a single snapshot or accumulate to create an aligned region. Further, in some embodiments, the data protection appliance (e.g., source DPA 112) may trim or otherwise segment the data of an unaligned I/O request to generate at least one aligned portion and at least one unaligned portion of the M.

Thus, aligned I/Os (or aligned portions of I/Os) may be replicated continuously (e.g., assigned a higher score), providing low RPO and high granularity of data recovery (e.g., PITs), while unaligned I/Os (or unaligned portions of I/Os) may be replicated by snapshots (e.g., assigned a lower score).

As shown in FIG. 12, at block 1202, process 608' begins. At block 1204, a starting offset and length (or starting offset and ending offset) are determined for a given I/O. At block 1206, the storage segment boundaries of the storage media are determined, for example, the page size, block size or sector size may be determined. At block 1208, the storage segment boundaries and offsets are compared to determine, at block 1210, whether the I/O (e.g., write request) is aligned or unaligned. At block 1210, if the I/O is not aligned, then process 608' completes at block 1214. At block 1210, if the I/O is aligned, then at block 1212, the I/O is indicated (or scored) as being aligned (e.g., aligned I/Os are more suitable for continuous replication and unaligned I/Os are more suitable for snapshot replication).

Although not shown in FIG. 12, in some embodiments it may be determined whether the I/O can be divided into at least one aligned portion and one or more unaligned portions to split the I/O such that at least one aligned portion can be replicated continuously and one or more remainder unaligned portions can be replicated by snapshot replication.

Figure 13:
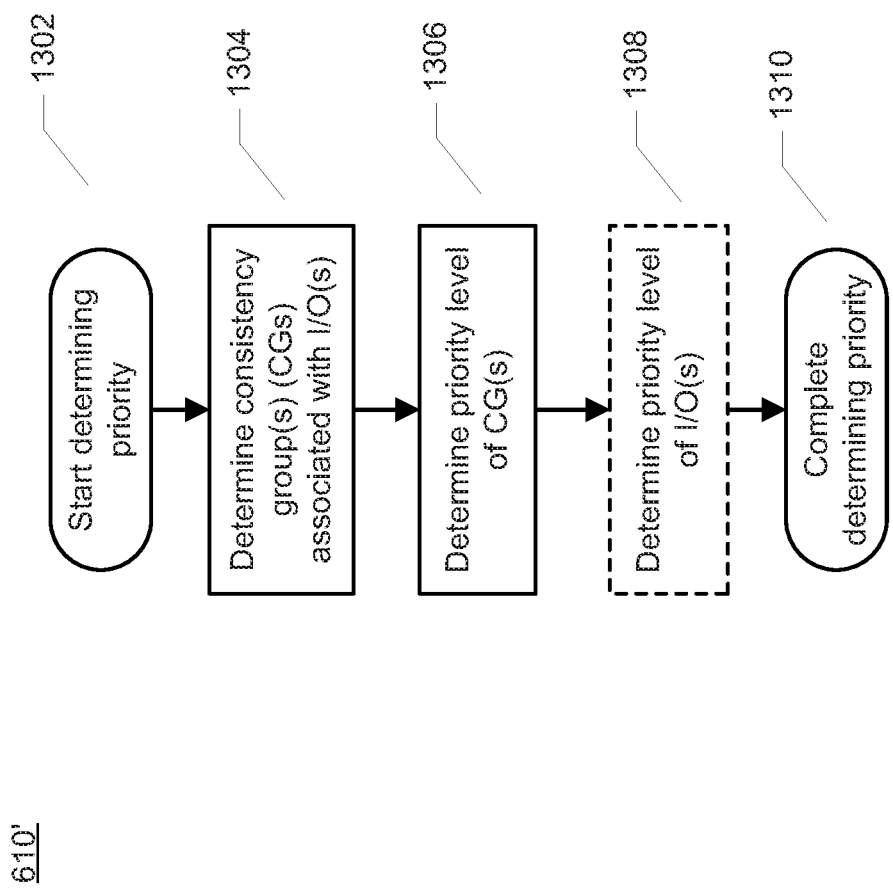
FIG. 13 is a flow diagram of an illustrative process to determine a priority level of an I/O, in accordance with an illustrative embodiment.

Referring to FIG. 13, greater detail of block 610 of FIG. 6 is shown as illustrative process 610'. As described herein, some embodiments may determine consistency group (CG) priority in assigning a score to an I/O. As described, a CG may be a group of production volumes and replication volumes that are treated as a single logical entity. At block 1302, process 610' begins. At block 1304, a CG associated with a given I/O is determined. For example, each I/O may be associated with a given CG (e.g., based upon an address of a write request, a volume of the write request, etc.). At block 1306, a priority level of the CGs may be determined. For example, some CGs may be assigned a higher priority level, for example because a given CG contains more critical data. At optional block 1308, in some embodiments, given I/Os may also have associated priority levels. For example, a given I/O may contain high priority data. At block 1310, process 610' completes.

Thus, as described herein, when several I/Os are received concurrently by the replication appliance (e.g., DPA 112), and there are limited system resources (e.g. WAN bandwidth, processor capacity, etc.), I/Os to CGs with a higher priority (e.g., a priority level at or above a priority threshold) may be scored to be continuously replicated (e.g., given a higher score than I/Os to CGs with lower priority) since continuous replication helps to meet the RPO (e.g., data on the replication volume lags data on the production volume by only a short time period). Similarly, when there are limited system resources (e.g. WAN bandwidth, processor capacity, etc.), I/Os to CGs with a lower priority (e.g., a priority level below a priority threshold) may be scored to be snapshot replicated (e.g., given a lower score than I/Os to CGs with higher priority) since snapshot replication reduces bandwidth and processor consumption, but also increases the replication volume lag of the production volume (e.g., might not meet the RPO). In some embodiments, the priority level of each CG may be configured by a system administrator of the storage system.

Figure 14:
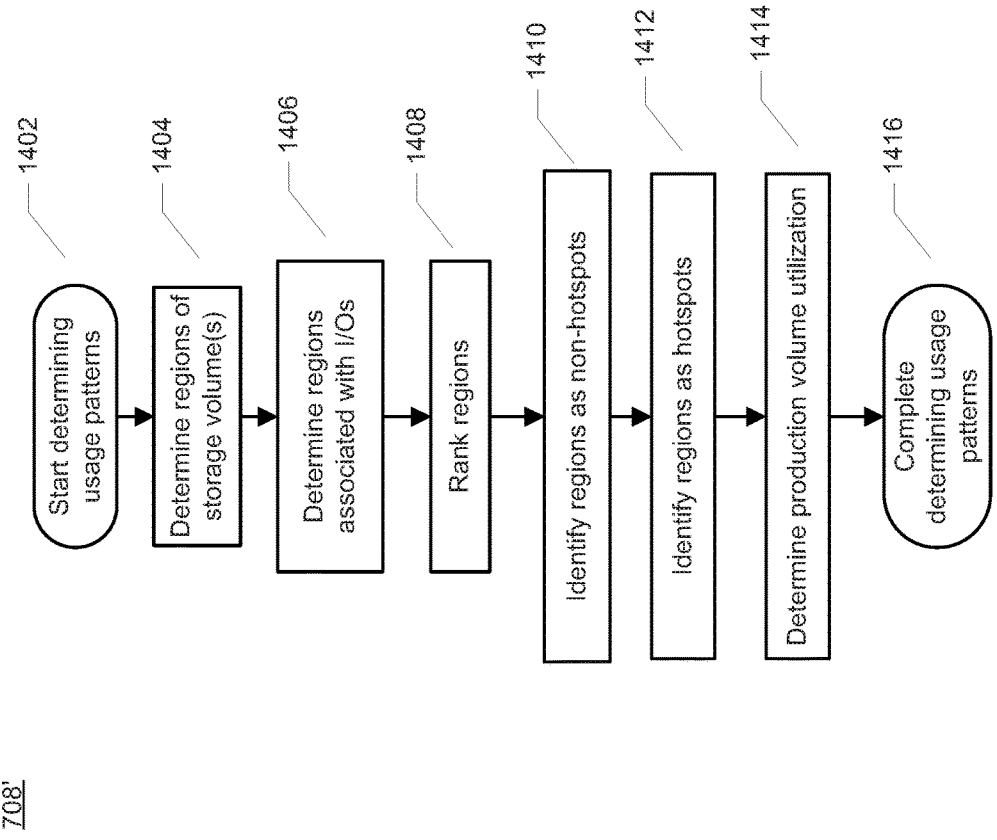
FIG. 14 is a flow diagram of an illustrative process to determine usage patterns of a production volume of the data protection system, in accordance with an illustrative embodiment.

Referring to FIG. 14, additional detail of block 708 of FIG. 7 is shown as process 708'. At block 1402, process 708' begins. At block 1404, regions of the production storage volumes are identified. For example, a given volume may include a plurality of physical blocks. In some embodiments, a physical block may be an addressable unit where data may be written to and/or read (e.g., a sector or a page may be a smallest addressable unit of a volume). In some embodiments, a logical block may include one or more physical blocks. One or more physical and/or logical blocks, generally referred to herein as "blocks", may be grouped into a region including one or more contiguous (or consecutive) blocks. For example, in an illustrative embodiment, each block may be a 4 KB block, and each region may include at least one block.

At block 1406, a region associated with a given I/O is determined. For example, in some embodiments, I/O requests (e.g., write requests) are tracked per region. For example, a number of received I/Os for each region and/or as an amount of data written per region may be monitored. At block 1408, regions may be ranked based upon the tracked I/O requests (e.g., by number of write requests and/or amount of data written to each region).

In some embodiments, at blocks 1410 and 1412, regions may be identified as hotspots or non-hotspots. For example, regions having a number of I/Os below a threshold, or a percentage of the total number of regions having the fewest relative I/Os (or the least relative data written), may be scored so as to be replicated via continuous replication (e.g., because these regions do not receive frequent write requests, continuous replication would not use much system resources). In other words, in some embodiments, at block 1410, regions having relatively few I/Os as determined at block 1408 are identified as non-hotspot regions. Similarly, at block 1412, regions having a number of I/Os at or above a threshold, or a percentage of the total number of regions having the most relative I/Os (or the most relative data written), may be scored so as to be protected via snapshot replication (e.g., because these regions receive frequent write requests, continuous replication would consume many system resources). In other words, in some embodiments, at block 1412, regions having relatively many write requests as determined at block 1408 are identified as hotspot regions.

At block 1414, some embodiments may also monitor production volume utilization in assigning a score to an I/O. For example, in some embodiments, the replication appliance (e.g., DPA 112) may monitor the utilization of the production volume (e.g., the production volume is processing many I/O requests, etc.). If production volume utilization is high, some embodiments adjust the score of given I/Os and/or adapt the score threshold to cause more I/Os to be replicated continuously and, thus, reduce the overhead of reading data from the production volume to generate snapshots during snapshot replication. At block 1416, process 708' completes.

Figure 15:
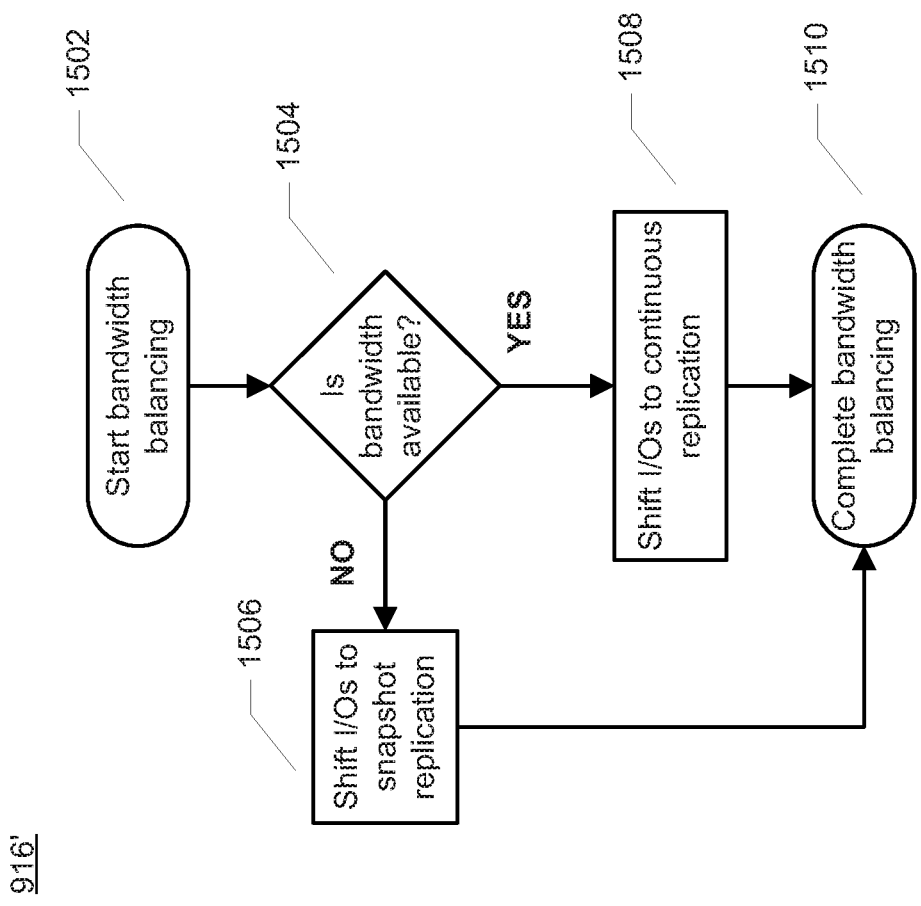
FIG. 15 is a flow diagram of an illustrative process to perform bandwidth balancing, in accordance with an illustrative embodiment.

Referring to FIG. 15, greater detail of block 916 of FIG. 9 is shown as illustrative process 916'. As described herein, some embodiments may perform dynamic bandwidth balancing that reduces (or stops) continuous replication during times when available bandwidth is limited and instead increases use of snapshot replication. Similarly, dynamic bandwidth balancing may increase continuous replication during times when bandwidth is available or the production volume is processing many I/Os. For example, snapshot replication bandwidth can be throttled by the replication appliance (e.g., DPA 112) limiting the read rate from the production volume or shifting I/Os from snapshot replication to continuous replication. Similarly, continuous replication bandwidth can be throttled dynamically by shifting I/Os from continuous replication to snapshot replication. In an embodiment, the dynamic bandwidth balancing may be implemented by adding a penalty to the score of I/Os received when the current WAN utilization is high (e.g., WAN bandwidth availability is low).

As shown in FIG. 15, at block 1502, process 916' begins. At block 1504, if bandwidth is available (e.g., bandwidth of wide area network 128), then at block 1508, additional I/Os can be replicated by continuous replication. For example, the scores of I/Os may be adjusted or the score threshold(s) adapted such that additional I/Os are replicated by continuous replication. If, at block 1504 bandwidth is not available (e.g., bandwidth of wide area network 128), then at block 1506, additional I/Os can be replicated by snapshot replication to reduce bandwidth consumption. For example, the scores of I/Os may be adjusted or the score threshold(s) adapted such that fewer I/Os are replicated by continuous replication. At block 1510, process 916' completes.

In some described embodiments, hosts 104 and 116 of FIG. 1 may each correspond to one computer, a plurality of computers, or a network of distributed computers. For example, in some embodiments, host 104 and/or host 116 may be implemented as one or more computers such as shown in FIG. 16. As shown in FIG. 16, computer 1600 may include processor 1602, volatile memory 1604 (e.g., RAM), non-volatile memory 1606 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1608 (e.g., a touchscreen, a display, and so forth) and input/output (I/O) device 1620 (e.g., a mouse, a keyboard, etc.). Non-volatile memory 1606 stores computer instructions 1612, an operating system 1616 and data 1618 such that, for example, the computer instructions 1612 are executed by the processor 1602 out of volatile memory 1604 to perform at least a portion of the processes shown in FIGS. 4-15. Program code may be applied to data entered using an input device of GUI 1608 or received from I/O device 1620.

The processes described herein are not limited to use with the hardware and software of FIG. 16 and may find applicability in any computing or processing environment and with any type of machine or set of machines that may be capable of running a computer program. The processes described herein may be implemented in hardware, software, or a combination of the two.

The processes described herein are not limited to the specific embodiments described. For example, the described processes are not limited to the specific processing order shown in the figures. Rather, any of the blocks of the processes may be re-ordered, combined or removed, performed in parallel or in serial, as necessary, to achieve the results set forth herein.

Processor 1602 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microcontrollers with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
   determining one or more properties for each of a plurality of input/output (I/O) to a production volume of a storage system, wherein determining the one or more properties for each of the plurality of I/O includes determining a hash value associated with the I/O;
   monitoring one or more operating conditions of the storage system;
   assigning a respective score to each I/O based upon one one or more properties of the I/O, wherein assigning a respective score to each I/O includes: detecting whether the hash value associated with the I/O is stored in a mapping table, when the hash value is stored in the mapping table, assigning a first score to the I/O such that the I/O is more likely to be replicated by continuous replication, and when the hash value is not stored in the mapping table, assigning a second score to the I/O such that the I/O is more likely to be replicated by snapshot replication;

adapting a replication threshold based upon the one or more operating conditions; and comparing the respective score of each I/O to the adapted replication threshold and, based upon the comparison, replicating the I/O using one of continuous replication and snapshot replication.

2. The method of claim 1, wherein determining the one or more properties further includes one or more of:
   determining a compressibility of each I/O;
   determining a deduplication ability of each I/O;
   determining an alignment of each I/O to a storage volume of the storage system; and
   determining a priority level associated with each I/O.

3. The method of claim 2, wherein determining the compressibility of each I/O comprises compressing at least a first portion of the I/O and determining an achieved compression level.

4. The method of claim 2, wherein determining the priority level associated with each I/O comprises:
   determining a consistency group (CG) associated with the I/O; and
   determining a priority level of the CG.

5. The method of claim 1, wherein monitoring the one or more operating conditions comprises at least one of:
   determining an available bandwidth of a communication link of the storage system;
   determining an available processing capacity of a processor of the storage system; and
   determining usage patterns of the production volume.

6. The method of claim 5, further comprising:
   when bandwidth of the communication link is available, adapting the replication threshold to increase continuous replication; and
   when bandwidth of the communication link is not available, adapting the replication threshold to decrease continuous replication.

7. The method of claim 5, further comprising:
   when processing capacity is available, adapting the replication threshold to decrease continuous replication; and
   when processing capacity is not available, adapting the replication threshold to increase continuous replication.

8. A method comprising:
   identifying a plurality of segments of a production volume of a storage system;
   for each of a plurality of input/output (I/O) to the production volume, detecting whether the I/O is aligned with one or more of the plurality of segments of the production volume;
   monitoring one or more operating conditions of the storage system;
   assigning a respective score to each I/O based upon whether the I/O is aligned with one or more of the plurality of segments of the production volume, wherein assigning a respective score to each I/O includes: (i) when the I/O is aligned with one or more of the plurality of segments, assigning a first score to the I/O such that the aligned I/O is more likely to be replicated by continuous replication, and (ii) when the I/O is not aligned with one or more of the plurality of segments, assigning a second score to the I/O such that the unaligned I/O is more likely to be replicated by snapshot replication;

adapting a replication threshold based upon the one or more operating conditions; and comparing the respective score of each I/O to the adapted replication threshold, and based upon the comparison, replicating the I/O using one of continuous replication and snapshot replication.

9. A method comprising:
   determining one or more properties for each of a plurality of input/output (I/O) to a production volume of a storage system;
   identifying one or more regions of the production volume;
   classifying each of the regions as either a hotspot region or a non-hotspot region based on a count of I/Os received for that region during an operating time window;
   assigning a respective score to each I/O based upon the one or more properties of the I/O;
   adapting a replication threshold based upon the one or more operating conditions, wherein adapting the replication threshold includes: (i) for hotspot regions, adapting the replication threshold to reduce continuous replication, and (ii) and for identified non-hotspot regions, adapting the replication threshold to increase continuous replication; and
   comparing the respective score of each I/O to the adapted replication threshold, and based upon the comparison, replicating the I/O using one of continuous replication and snapshot replication.

10. A system comprising:
   a processor; and
   memory storing computer program code that when executed on the processor causes the processor to operate a storage system, the storage system operable to perform the operations of:
   determining one or more properties for each of a plurality of input/output (I/O) to a production volume of the storage system, wherein determining the one or more properties for each of the plurality of I/O includes determining a hash value associated with the I/O;
   monitoring one or more operating conditions of the storage system;
   assigning a respective score to each I/O based upon the one or more properties of the I/O, wherein assigning a respective score to each I/O includes: detecting whether the hash value associated with the I/O is stored in a mapping table, when the hash value is stored in the mapping table, assigning a first score to the I/O such that the I/O is more likely to be replicated by continuous replication, and when the hash value is not stored in the mapping table, assigning a second score to the I/O such that the I/O is more likely to be replicated by snapshot replication;
   adapting a replication threshold based upon the one or more operating conditions; and
   comparing the respective score of each I/O to the adapted replication threshold and, based upon the comparison, replicating the I/O using one of continuous replication and snapshot replication.

11. The system of claim 10, wherein determining the one or more properties further includes one or more of:
   determining a compressibility of each I/O;
   determining a deduplication ability of each I/O;

determining an alignment of each I/O to a storage volume of the storage system; and determining a priority level associated with each I/O.

12. The system of claim 11, wherein determining the compressibility of each I/O comprises compressing at least a first portion of the I/O and determining an achieved compression level.

13. The system of claim 11, wherein determining the priority level associated with each I/O comprises:

determining a consistency group (CG) associated with the I/O; and determining a priority level of the CG.

14. The system of claim 10, wherein monitoring the one or more operating conditions comprises at least one of:

determining an available bandwidth of a communication link of the storage system;

determining an available processing capacity of a processor of the storage system; and determining usage patterns of the production volume.

15. The system of claim 14, further comprising:

when bandwidth of the communication link is available, adapting the replication threshold to increase continuous replication; and when bandwidth of the communication link is not available, adapting the replication threshold to decrease continuous replication.

16. A system comprising:

a processor; and memory storing computer program code that when executed on the processor causes the processor to operate a storage system configured to perform in a continuous replication mode and snapshot replication mode, the storage system operable to perform the operations of:

identifying a plurality of segments of a production volume of the storage system;

for each of a plurality of input/output (I/O) to the production volume, detecting whether the I/O is aligned with one or more of the plurality of segments of the production volume;

monitoring one or more operating conditions of the storage system;

assigning a respective score to each I/O based upon whether the I/O is aligned with one or more of the plurality of segments of the production volume, wherein assigning a respective score to each I/O includes: (i) when the I/O is aligned with one or more of the plurality of segments, assigning a first score to the I/O such that the aligned I/O is more likely to be replicated by continuous replication, and (ii) when the I/O is not aligned with one or more of the plurality of segments, assigning a second score to the I/O such that the unaligned I/O is more likely to be replicated by snapshot replication;

adapting a replication threshold based upon the one or more operating conditions; and comparing the respective score of each I/O to the adapted replication threshold, and based upon the comparison, replicating the I/O using one of continuous replication and snapshot replication.

17. A system comprising:

a processor; and memory storing computer program code that when executed on the processor causes the processor to operate a storage system configured to perform in a continuous replication mode and snapshot replication mode, the storage system operable to perform the operations of:

determining one or more properties for each of a plurality of input/output (I/O) to a production volume of the storage system;

identifying one or more regions of the production volume;

classifying each of the regions as either a hotspot region or a non-hotspot region based on a count of I/Os received for that region during an operating time window;

assigning a score to each I/O based upon the one or more properties of the I/O;

adapting a replication threshold based upon the one or more operating conditions, wherein adapting the replication threshold includes: (i) for hotspot regions, adapting the replication threshold to reduce continuous replication, and (ii) for non-hotspot regions, adapting the replication threshold to increase continuous replication; and comparing the respective score of each I/O to the adapted replication threshold, and based upon the comparison, replicating the I/O using one of continuous replication and snapshot replication.

18. A computer program product including a non-transitory computer readable storage medium having computer program code encoded thereon that when executed on a processor of a computer causes the computer to operate a storage system configured, the computer program product comprising computer program code for:

determining one or more properties for each of a plurality of input/output (I/O) to a production volume of the storage system, wherein determining the one or more properties for each of the plurality of I/O includes determining a hash value associated with the I/O;

monitoring one or more operating conditions of the storage system;

assigning a respective score to each I/O based upon the one or more properties of the I/O, wherein assigning a respective score to each I/O includes: detecting whether the hash value associated with the I/O is stored in a mapping table, when the hash value is stored in the mapping table, assigning a first score to the I/O such that the I/O is more likely to be replicated by continuous replication, and when the hash value is not stored in the mapping table, assigning a second score to the I/O such that the I/O is more likely to be replicated by snapshot replication;

adapting a replication threshold based upon the one or more operating conditions; and comparing the respective score of each I/O to the adapted replication threshold and, based upon the comparison, replicating the I/O using one of continuous replication and snapshot replication.

* * * * *